US012757004B2

(12) United States Patent
Lu et al.

(10) Patent No.: US 12,757,004 B2
(45) Date of Patent: Oct. 6, 2026

(54) INTEGRATED ACCESS AND BACKHAUL COMMUNICATION DEVICE AND METHOD

(71) Applicant: 1FINITY Inc., Kawasaki (JP)

(72) Inventors: Yang Lu, Beijing (CN); Su Yi, Beijing (CN)

(73) Assignee: 1FINITY Inc., Kawasaki (JP)

( * ) Notice: Subject to any disclaimer, the term of this patent is extended or adjusted under 35 U.S.C. 154(b) by 306 days.

(21) Appl. No.: 18/431,162

(22) Filed: Feb. 2, 2024

(65) Prior Publication Data

US 2024/0259776 A1 Aug. 1, 2024

Related U.S. Application Data

(63) Continuation of application No. PCT/CN2021/110683, filed on Aug. 4, 2021.

(51) Int. Cl.
*H04W 8/08* (2009.01)
*H04L 45/74* (2022.01)

(52) U.S. Cl.
CPC ............... *H04W 8/08* (2013.01); *H04L 45/74* (2013.01)

(58) Field of Classification Search
CPC ................................. H04W 8/08; H04L 45/74
See application file for complete search history.

(56) References Cited

U.S. PATENT DOCUMENTS 12,010,739 B2* 6/2024 Akl ..................... H04W 36/087
2021/0058826 A1* 2/2021 Mao .................. H04W 28/0933
2021/0099385 A1* 4/2021 Huang ................... H04B 7/022
2021/0127319 A1 4/2021 Huang et al.
2022/0117007 A1* 4/2022 Akl ..................... H04W 36/087
2023/0232285 A1* 7/2023 Barac ................ H04W 36/0009 370/331
2023/0232294 A1* 7/2023 Teyeb .............. H04W 36/0235 370/331

(Continued)

FOREIGN PATENT DOCUMENTS

CN 110351700 A 10/2019
WO 2008/114449 A1 9/2008
WO 2020/039400 A1 2/2020

OTHER PUBLICATIONS

International Search Report and Written Opinion of the International Searching Authority issued by the China National Intellectual Property Administration for corresponding International Patent Application No. PCT/CN2021/110683, mailed on Mar. 30, 2022, with an English translation.

(Continued)

*Primary Examiner* — Ajay Cattungal
(74) *Attorney, Agent, or Firm* — Myers Wolin, LLC

(57) ABSTRACT

The embodiments of the present disclosure provide an integrated access and backhaul (IAB) communication device and a method thereof. The method includes: adding, by a second donor distributed unit (a target donor-DU), a header related to a transport network layer (TNL) tunnel to uplink data, and transmitting the uplink data to a first donor distributed unit (a source donor-DU) via the TNL tunnel; and/or adding, by a first donor distributed unit (a source donor-DU), a header related to a transport network layer (TNL) tunnel to downlink data, and transmitting the downlink data to a second donor distributed unit (a target donor-DU) via the TNL tunnel.

10 Claims, 11 Drawing Sheets

(56) References Cited

U.S. PATENT DOCUMENTS

| | | | | |
|---|---|---|---|---|
| 2023/0239755 | A1* | 7/2023 | Teyeb | H04W 36/0064 370/331 |
| 2024/0205795 | A1* | 6/2024 | Barac | H04W 40/36 |
| 2024/0244547 | A1* | 7/2024 | Ghanbarinejad | H04L 5/0035 |

OTHER PUBLICATIONS

The Extended European search report with the Supplementary European search report and the European search opinion, issued by the European Patent Office for corresponding European Patent Application No. 21952264.6, mailed on May 22, 2025.

Qualcomm Incorporated, "Inter-donor IAB-node Migration", Agenda Item: 13.2.1, 3GPP TSG-RAN WG3 Meeting #110-e, R3-206256, E-meeting, Nov. 2-12, 2020.

Notice of Reasons for Refusal issued by the Japan Patent Office for corresponding Japanese Patent Application No. 2024-506592, mailed on Feb. 25, 2025, with an English translation.

Nokia et al., "Discussion on Inter-Donor-DU re-routing", Agenda Item: 13.3.2, 3GPP TSG RAN WG3 Meeting #112-e, R3-211895, May 17-27, 2021.

Nokia (moderator), "Summary of email Discussion on CB: # 41_IAB_Multi HopPerf", Agenda Item: 13.3.2, 3GPP TSG RAN WG3 #112-e, R3-212681, May 17-27, 2021.

Qualcomm Incorporated, "Interruption time reduction for Intra-donor IAB-node Migration", Agenda Item: 13.2.2, 3GPP TSG RAN WG3 #111-e, R3-210348, E-meeting, Jan. 25-Feb. 5, 2021.

* cited by examiner

INTEGRATED ACCESS AND BACKHAUL COMMUNICATION DEVICE AND METHOD

CROSS-REFERENCE TO RELATED APPLICATION

This application is a continuation of International Application No. PCT/CN2021/110683, filed on Aug. 4, 2021, the entire contents of which are incorporated herein by reference.

TECHNICAL FIELD

The embodiments of the present disclosure relate to the communication field.

BACKGROUND

Future seamless cellular network deployment requires very a flexible and ultra-dense NR cell deployment, an ultra-dense network is one of the goals of 5G, and deploying a new radio (NR) network that does not require wired backhaul is very important to implement the ultra-dense network of 5G. Because a 5G millimeter wave reduces a coverage of a cell, a wireless self-backhaul system needs multi-hops to meet deployment requirements. The high bandwidth, massive Multiple Input Multiple Output (MIMO) and beam system of 5G make 5G easier to develop a wireless self-backhaul system of an ultra-dense NR cell compared to LTE. In order to develop such multi-hop system with wireless self-backhaul, 3GPP starts research and standardization of an Integrated Access and Backhaul (IAB) project at R16.

FIG. 1 is a schematic diagram of an IAB system. As shown in FIG. 1, in the IAB system, a relay node supports both access and backhaul functions. A wireless transmission link of the relay node multiplexes an access link and a backhaul link in a time domain, a frequency domain or a space domain, and the access link and the backhaul link may use the same or different frequency bands.

In an IAB network architecture, the relay node refers to an IAB-node that supports both access and backhaul functions. A last-hop access node at a network side is called IAB-donor that supports a gNB function and supports IAB-node access. All UE data may be backhauled to the IAB-Donor via the IAB-node through one or more hops.

The function of the IAB-node is divided into two parts, one is a gNB-DU function, called IAB-DU (a distributed unit), and the other is a UE function, called IAB-MT (a mobile terminal). The IAB-DU achieves a function of a network side device, is connected to a downstream child IAB-node (child IAB node), provides NR air interface access for a UE and the downstream child IAB-node, and establishes an F1 connection with an IAB Donor-CU. The IAB-MT achieves a partial function of a terminal equipment, is connected to an upstream parent IAB-node (parent IAB node) or an IAB-Donor DU, includes functions of a physical layer, a layer 2, Radio Resource Control (RRC) and a Non-Access Stratum (NAS), and is further connected to the IAB Donor-CU and a Core Network (CN) indirectly.

In the IAB system, the IAB-node may be accessed to a network through a Standalone (SA) mode or an E-UTRA-NRDualConnectivity (EN-DC) mode. FIG. 2 is a schematic diagram of an IAB architecture in the SA mode. FIG. 3 is a schematic diagram of an IAB architecture in the EN-DC mode.

FIG. 4 is a schematic diagram of an IAB node (IAB-node), a parent node (parent IAB-node) thereof and a descendant node (child IAB-node) thereof. As shown in FIG. 4, the IAB-DU of the IAB node as a network side connects to the IAB-MTs of the descendant nodes, and the IAB-MT of the IAB node as a terminal side connects to the IAB-DUs of the parent nodes.

FIG. 5 is a schematic diagram of an F1 user plane (F1-U) protocol stack between the IAB-DU and the IAB-Donor CU. FIG. 6 is a schematic diagram of an F1 control plane (F1-C) protocol stack between the IAB-DU and the IAB-Donor CU. As shown in FIGS. 5 and 6, the F1-U and the F1-C are established on a transmission (IP) layer between the IAB-DU and the IAB-Donor-CU. FIGS. 5 and 6 show two-hops wireless backhaul and one-hop wired backhaul.

On a backhaul link, the transmission (IP) layer is carried on a Backhaul Adaptive Protocol (BAP) sublayer, a BAP entity in the IAB-node implements a routing function of the IAB system, a routing table being provided by the IAB-Donor CU. A BAP PDU (Protocol Data Unit) is transmitted in an RLC (Radio Link Control) channel of the backhaul link, a plurality of RLC channels of the backhaul link may be configured by the IAB-Donor to carry services with different priorities and QoS (Quality of Service), the BAP PDU being mapped by the BAP entity to different backhaul RLC channels.

If an IAB-node of an IAB network disconnects from an original parent IAB-node and connects to a new parent IAB-node, or when the IAB-node remains connected to the original parent node and increases connection to a new parent node, namely, when it becomes dual connection, an IAB network topology is affected by a change.

FIG. 7 is a schematic diagram of a network topology change. As shown in FIG. 7, after IAB-node 5 switches from a cell in IAB-node 3 to a cell in IAB-node 4, an F1 transmission path from IAB-node 5 and its downstream node IAB-node 6 to Donor-CU changes from passing through IAB-node 1 and IAB-node 2 to passing through IAB-node 2 and IAB-node 4, which means network topology changes. Or, after IAB-node 5 increases connection to IAB-node 4 to become dual connection, a path passing through IAB-node 1 and IAB-node 2 is added to the F1 transmission path from IAB-node 5 and its downstream node IAB-node 6 to Donor-CU, which means network topology changes.

It should be noted that the above introduction to the technical background is just to facilitate a clear and complete description of the technical solutions of the present disclosure, and is elaborated to facilitate the understanding of persons skilled in the art, it cannot be considered that these technical solutions are known by persons skilled in the art just because these solutions are elaborated in the Background of the present disclosure.

SUMMARY

The inventor finds that in some circumstances after the network topology changes, the IAB-node and its descendant node may not be configured with a Transmission Network Layer (TNL) address that may be routed through a target Donor-DU. Uplink data may be discarded by the target Donor-DU, while downlink data may be discarded by a source Donor-DU.

In order to solve at least one of the above problems, the embodiments of the present disclosure provide an IAB communication device and a method thereof.

According to one aspect of the embodiments of the present disclosure, an IAB communication method is provided, including:

receiving, by a second donor distributed unit, uplink data transmitted by an IAB node;

adding a header related to a transport network layer (TNL) tunnel to the uplink data; and transmitting the uplink data to a first donor distributed unit via the transport network layer tunnel.

According to another aspect of the embodiments of the present disclosure, an IAB communication device is provided, including:

a receiving portion configured to receive uplink data transmitted by an IAB node;

a processing portion configured to add a header related to a transport network layer (TNL) tunnel to the uplink data; and a transmitting portion configured to transmit the uplink data to a first donor distributed unit via the transport network layer tunnel.

According to another aspect of the embodiments of the present disclosure, an IAB communication method is provided, including:

receiving, by a first donor distributed unit, downlink data transmitted to an IAB node;

adding a header related to a transport network layer (TNL) tunnel to the downlink data; and transmitting the downlink data to a second donor distributed unit via the transport network layer tunnel.

According to another aspect of the embodiments of the present disclosure, an IAB communication device is provided, including:

a receiving portion configured to receive downlink data transmitted to an IAB node;

a processing portion configured to add a header related to a transport network layer (TNL) tunnel to the downlink data; and a transmitting portion configured to transmit the downlink data to a second donor distributed unit via the transport network layer tunnel.

One of advantageous effects of the embodiments of the present disclosure lies in: adding, by a second donor distributed unit (a target donor-DU), a header related to a TNL tunnel to uplink data, and transmitting the uplink data to a first donor distributed unit (a source donor-DU) via the TNL tunnel; and/or adding, by a first donor distributed unit (a source donor-DU), a header related to a TNL tunnel to downlink data, and transmitting the downlink data to a second donor distributed unit (a target donor-DU) via the TNL tunnel, thereby establishing a TNL tunnel between the source donor-DU and the target donor-DU of IAB-node migration, which may solve the problem that uplink data or downlink data is discarded.

Referring to the later description and drawings, specific implementations of the present disclosure are disclosed in detail, indicating a manner that the principle of the present disclosure can be adopted. It should be understood that the implementations of the present disclosure are not limited in terms of the scope. Within the scope of the spirit and terms of the appended supplements, the implementations of the present disclosure include many changes, modifications and equivalents.

Features that are described and/or illustrated with respect to one implementation may be used in the same way or in a similar way in one or more other implementations and in combination with or instead of the features in the other implementations.

It should be emphasized that the term "comprise/include" when being used herein refers to the presence of a feature, a whole piece, a step or a component, but does not exclude the presence or addition of one or more other features, whole pieces, steps or components.

BRIEF DESCRIPTION OF DRAWINGS

An element and a feature described in a drawing or an implementation of the present embodiments of the present disclosure can be combined with an element and a feature shown in one or more other drawings or implementations. In addition, in the drawings, similar labels represent corresponding components in several drawings and may be used to indicate corresponding components used in more than one implementation.

The included drawings are used to provide a further understanding on the embodiments of the present disclosure, constitute a part of the Specification, are used to illustrate the implementations of the present disclosure, and expound the principle of the present disclosure together with the text description. Obviously, the drawings in the following description are only some embodiments of the present disclosure. Persons skilled in the art can also obtain other drawings based on the drawings under the premise that they do not pay inventive labor. In the drawings.

DETAILED DESCRIPTION

Figure 1:
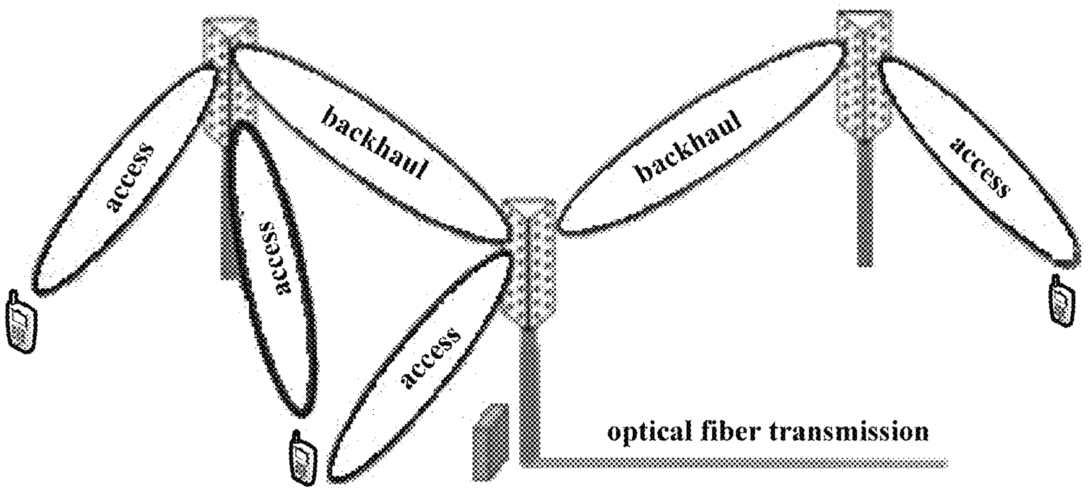
FIG. 1 is a schematic diagram of an IAB system.
Figure 2:
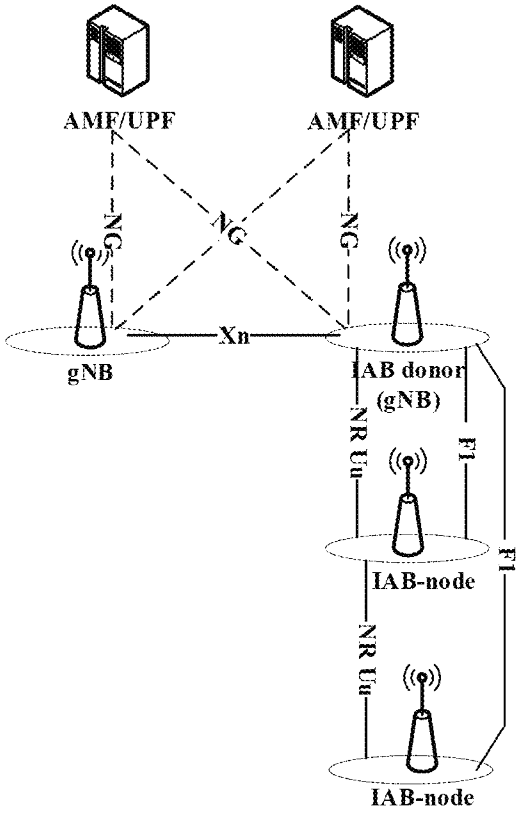
FIG. 2 is a schematic diagram of an IAB architecture in a SA mode.
Figure 3:
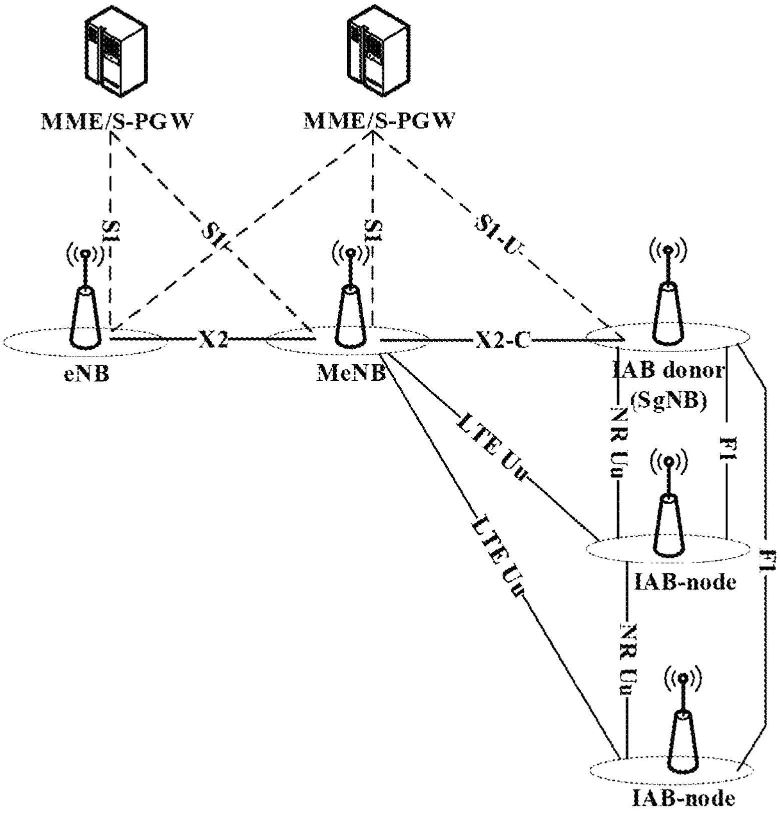
FIG. 3 is a schematic diagram of an IAB architecture in an EN-DC mode.
Figure 4:
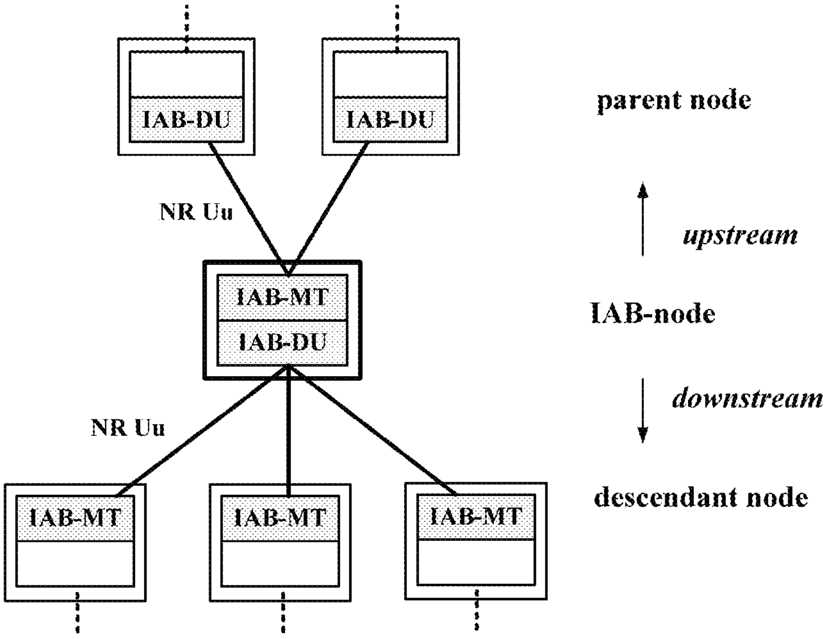
FIG. 4 is a schematic diagram of a parent node (parent IAB-node) and a descendant node (child IAB-node)
Figure 5:
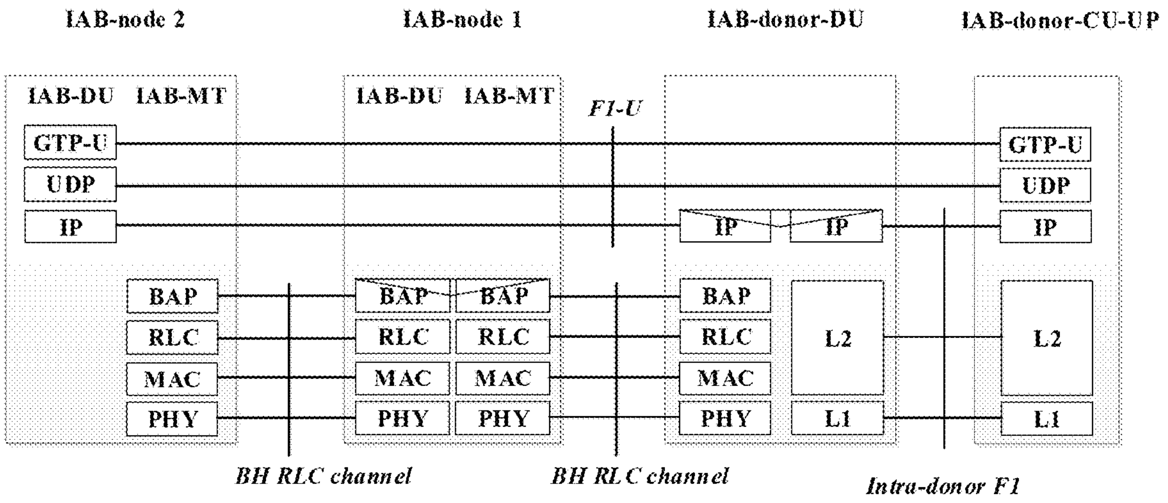
FIG. 5 is a schematic diagram of an F1-U protocol stack of the IAB system.
Figure 6:
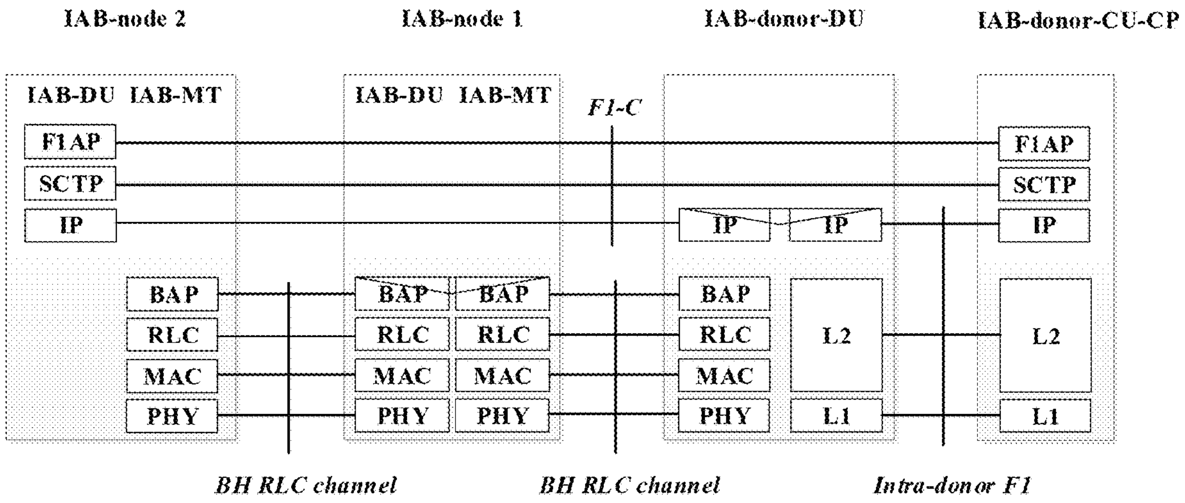
FIG. 6 is a schematic diagram of an F1-C protocol stack of the IAB system.
Figure 7:
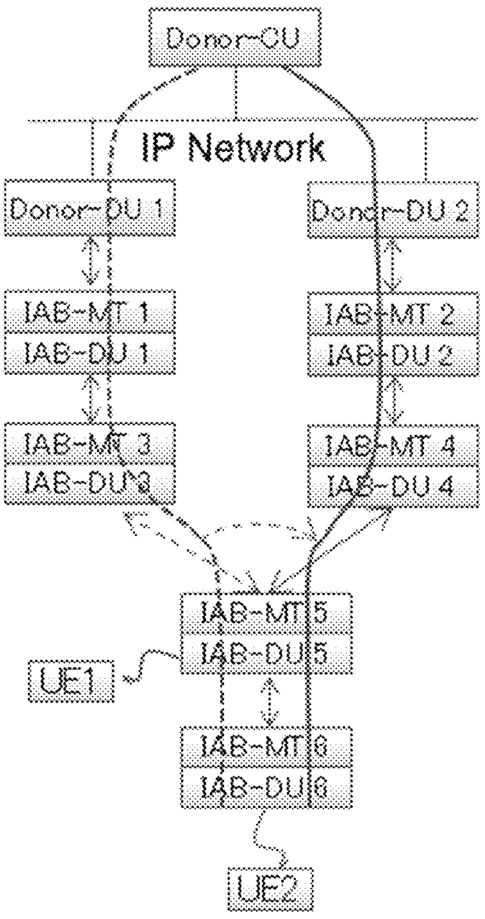
FIG. 7 is a schematic diagram of a network topology change.

Referring to the drawings, through the following Specification, the above and other features of the present disclosure will become obvious. The Specification and the drawings specifically disclose particular implementations of the present disclosure, showing partial implementations which can adopt the principle of the present disclosure. It should be understood that the present disclosure is not limited to the described implementations, on the contrary, the present disclosure includes all the modifications, variations and equivalents falling within the scope of the attached supplements.

In the embodiments of the present disclosure, the term "first" and "second", etc. are used to distinguish different elements in terms of appellation, but do not represent a spatial arrangement or time sequence, etc. of these elements, and these elements should not be limited by these terms. The term "and/or" includes any and all combinations of one or more of the associated listed terms. The terms "include", "comprise" and "have", etc. refer to the presence of stated features, elements, members or components, but do not preclude the presence or addition of one or more other features, elements, members or components.

In the embodiments of the present disclosure, the singular forms "a/an" and "the", etc. include plural forms, and should be understood broadly as "a kind of" or "a type of", but are not defined as the meaning of "one"; in addition, the term "the" should be understood to include both the singular forms and the plural forms, unless the context clearly indicates otherwise. In addition, the term "according to" should be understood as "at least partially according to . . . ", the term "based on" should be understood as "at least partially based on . . . ", unless the context clearly indicates otherwise.

In the embodiments of the present disclosure, the term "a communication network" or "a wireless communication network" may refer to a network that meets any of the following communication standards, such as New Radio (NR), Long Term Evolution (LTE), LTE-Advanced (LTE-A), Wideband Code Division Multiple Access (WCDMA), High-Speed Packet Access (HSPA) and so on.

And, communication between devices in a communication system may be carried out according to a communication protocol at any stage, for example may include but be not limited to the following communication protocols: 1G (generation), 2G, 2.5G, 2.75G, 3G, 4G, 4.5G, and future 5G, 6G and so on, and/or other communication protocols that are currently known or will be developed in the future.

In the embodiments of the present disclosure, the term "a network device" refers to, for example, a device that accesses a terminal equipment in a communication system to a communication network and provides services to the terminal equipment. The network device may include but be not limited to the following devices: a Base Station (BS), an Access Point (AP), a Transmission Reception Point (TRP), a broadcast transmitter, a Mobile Management Entity (MME), a gateway, a server, a Radio Network Controller (RNC), a Base Station Controller (BSC) and so on.

The base station may include but be not limited to: a node B (NodeB or NB), an evolution node B (eNodeB or eNB) and a 5G base station (gNB), etc., and may further includes a Remote Radio Head (RRH), a Remote Radio Unit (RRU), a relay or a low power node (such as femto, pico, etc.). And the term "BS" may include their some or all functions, each BS may provide communication coverage to a specific geographic region. The term "a cell" may refer to a BS and/or its coverage area, which depends on the context in which this term is used.

In the embodiments of the present disclosure, the term "a User Equipment (UE)" refers to, for example, a device that accesses a communication network and receives network services through a network device, or may also be called "Terminal Equipment (TE)". The terminal equipment may be fixed or mobile, and may also be called a Mobile Station (MS), a terminal, a user, a Subscriber Station (SS), an Access Terminal (AT) and a station and so on.

The terminal equipment may include but be not limited to the following devices: a Cellular Phone, a Personal Digital Assistant (PDA), a wireless modem, a wireless communication device, a handheld device, a machine-type communication device, a laptop computer, a cordless phone, a smart phone, a smart watch, a digital camera and so on.

For another example, under a scenario such as Internet of Things (IoT), the terminal equipment may also be a machine or apparatus for monitoring or measurement, for example may include but be not limited to: a Machine Type Communication (MTC) terminal, a vehicle-mounted communication terminal, a Device to Device (D2D) terminal, a Machine to Machine (M2M) terminal and so on.

Rel-16 NR has standardized a process of updating network topology when an IAB-node moves under the same donor-CU. When the IAB-node changes a parent node, the Donor-CU configures a configuration related to network topology update for the IAB-node through an RRC reconfiguration message, so that the IAB-node migrates an F1 transmission path.

The configuration related to network topology update includes updating a BAP address of the IAB-node, and updating a backhaul RLC channel (BH RLC channel) of uplink F1-C, F1-U and non-F1 data and a BAP routing identifier (a BAP address and a path identifier of the Donor-DU). If the target Donor-DU is different from the source donor-DU after migration, a source TNL address that may be routed via the Donor-DU further needs to be updated, and the TNL address is allocated by the target Donor-DU.

The configuration related to network topology update starts to be applied when the IAB-node is accessed to a new parent node, i.e., the IAB-node starts to use a new BAP address, uplink F1 transmission and non-F1 transmission of the IAB-node starts to use configured BAP routing identifier and source TNL address. For a downstream descendant node of the IAB-node, the configuration related to network topology update is carried out also using the same method.

Figure 8:
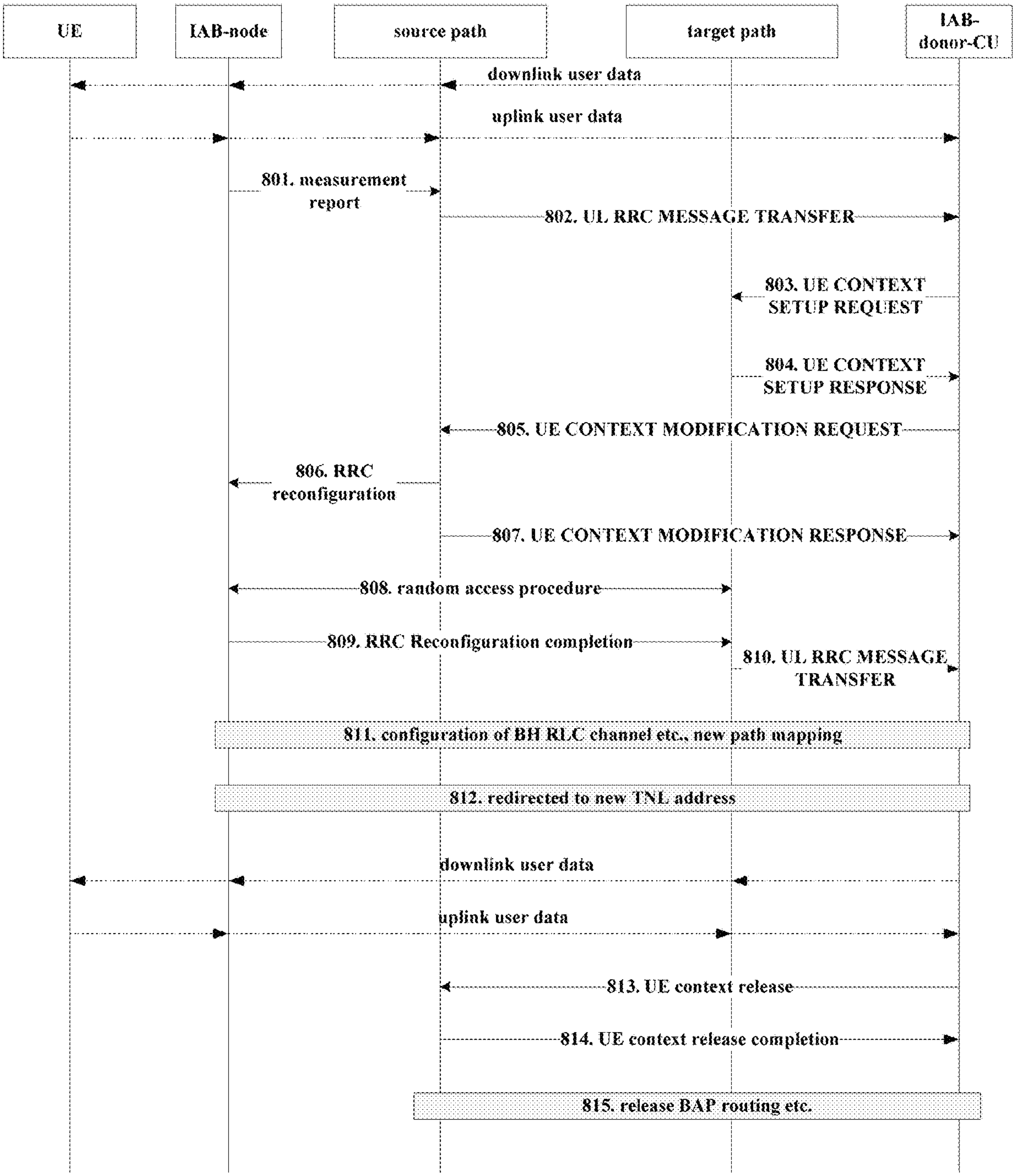
FIG. 8 is a schematic diagram of an intra-CU topology adaptation process.

FIG. 8 is a schematic diagram of an intra-CU topology adaptation process. Currently standardized intra-CU topology adaptation is shown, including switching of IAB-MT for migrating the IAB-node, and a migration process of F1 connection between the IAB-DU and the donor-CU.

In FIG. 8, some entities are omitted for the sake of simplicity. For example, a source path may include at least one of a source parent IAB-node, an intermediate hop IAB-node on source path or a source IAB-donor-DU, and a target path may include at least one of a target parent IAB-node, an intermediate hop IAB-node on target path or a target IAB-donor-DU. FIG. 8 only schematically illustrates performing Intra-CU topology adaptation for the IAB node, the present disclosure is not limited to this. For detailed content, relevant technologies may be further referred to.

In the existing topology redundancy process, the IAB-node and its descendant node may not be configured with the TNL address that may be routed via the target Donor-DU. After the IAB-node is accessed to a new parent node, the source TNL address of uplink data is still the TNL address that may be routed via the source Donor-DU, i.e., the TNL address allocated by the source Donor-DU.

If the target Donor-DU after IAB-node migration is different from the source Donor-DU, i.e., when intra-donor CU topology redundancy or inter-donor CU topology redundancy is performed, uplink data of which the source TNL address is the TNL address allocated by the source Donor-DU is transmitted to the target donor-DU via a migrated path. And because what is carried by such data is not the TNL address allocated by the target Donor-DU, and the data is discarded by a source TNL address filtering function of the target Donor-DU.

Correspondingly, the target TNL address of downlink data is still the TNL address that may be routed by the source Donor-DU, i.e., the TNL address allocated by the source Donor-DU. If the target Donor-DU after IAB-node migration is different from the source Donor-DU, downlink data of which the target TNL address is the TNL address allocated by the source Donor-DU may not be routed to the target Donor-DU, thus is discarded by the source Donor-DU.

In addition, even if the IAB-node and its descendant node are configured with the TNL address that may be routed via the target Donor-DU, when the migrated IAB-node is accessed to a new parent node, in the IAB-node and its descendant node there may also be some uplink data (UL data inflight) of which source TNL address uses the TNL address that may be routed by the source Donor-DU, i.e., uplink data of which the source TNL address is the TNL address allocated by the source Donor-DU. If the target Donor-DU after IAB-node migration is different from the source Donor-DU, uplink data of which the source TNL address is the TNL address allocated by the source Donor-DU is discarded by a source TNL address filtering function of the target Donor-DU.

Correspondingly, when the migrated IAB-node is accessed to a new parent node, in the source Donor-DU there may also be some downlink data (DL data inflight) of which the target TNL addresses is the TNL address that may be routed via the source Donor-DU before the migration, i.e., downlink data of which the target TNL address is the TNL address allocated by the source Donor-DU. If the target Donor-DU after IAB-node migration is different from the source Donor-DU, downlink data of which the target TNL address is the TNL address allocated by the source Donor-DU may be discarded by the source Donor-DU.

For the above problems or similar problems, the embodiments of the present disclosure provide a TNL tunnel between donor-DUs, which is described in detail below. In the embodiments of the present disclosure, the IAB node includes a migrated IAB-node or its descendant node, unless otherwise specified.

Embodiments of a First Aspect

The embodiments of the present disclosure provide an IAB communication method, which is illustrated from a side of transmission of uplink data by a second donor distributed unit. An IAB node is migrated from a first donor distributed unit (a source donor-DU) to a second donor distributed unit (a target donor-DU), and a transport network layer (TNL) tunnel is established between the first donor distributed unit and the second donor distributed unit.

Figure 9:
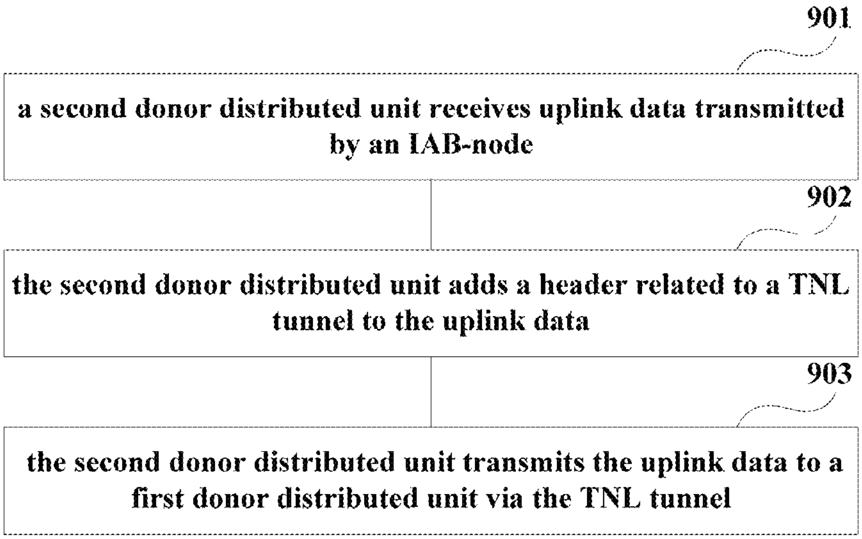
FIG. 9 is a schematic diagram of an IAB communication method in the embodiments of the present disclosure.

FIG. 9 is a schematic diagram of an IAB communication method in the embodiments of the present disclosure. As shown in FIG. 9, the method includes:

901, a second donor distributed unit receives uplink data transmitted by an IAB node;

902, the second donor distributed unit adds a header related to a TNL tunnel to the uplink data; and

903, the second donor distributed unit transmits the uplink data to the first donor distributed unit via the TNL tunnel.

It should be noted that the above FIG. 9 is only schematic description of the embodiments of the present disclosure, but the present disclosure is not limited to this. For example, an execution step of each operation may be adjusted appropriately, moreover other some operations may be increased or reduced. Persons skilled in the art may make appropriate modifications according to the above contents, not limited to the records in the above FIG. 9.

In some embodiments, the header (also called a head) includes at least one of the following: an Internet Protocol (IP) header, a General Packet Radio Service (GPRS) Tunneling Protocol (GTP) header, a User Datagram Protocol (UDP) header or a Transmission Control Protocol (TCP) header.

In some embodiments, a source transport network layer (TNL) address of the header is a TNL address of the second donor distributed unit or a TNL address that is able to be routed by the second donor distributed unit, and a target TNL address of the header is a TNL address of the first donor distributed unit.

For example, uplink data of which a source TNL address is the TNL address routed by the source Donor-DU may be added with an IP header by the target donor-DU, or is further added with a GTP/UDP or TCP header. The source TNL address in the added IP header and GTP/UDP or TCP header are a TNL address of the target donor-DU or a TNL address that may be routed via the target donor-DU, and the target TNL address is a TNL address of a tunnel endpoint at the source donor-DU side (i.e., the TNL address of the source donor-DU).

Hence, a TNL tunnel is established between the source donor-DU and the target donor-DU of the IAB-node migration, so that when the IAB-node performs migration across donor distributed units, uplink data of which the source TNL address being a TNL address that may be routed via the source Donor-DU is transmitted by the target donor-DU to the source donor-DU via the TNL tunnel, and then is routed by the source donor-DU to the donor-CU, which may solve the problem that such uplink data is discarded by the target donor-DU.

The embodiments of the present disclosure are further described below through transmission of uplink data in different scenarios.

First, uplink data transmission in an intra-donor CU migration scenario (for example, called Scenario 1) is described.

In some embodiments, a migrated IAB-node switches from a first donor distributed unit to a second donor distributed unit, or radio resource control (RRC) is reestablished to the second donor distributed unit after a radio link failure (RLF) from the migrated IAB-node to the first donor distributed unit, wherein the first donor distributed unit and the second donor distributed unit belong to the same donor centralized unit (donor-CU).

In other words, when the IAB-node performs intra-donor CU migration, TNL tunnel transmission is performed between the source donor-DU and the target donor-DU. For example, when the migrated IAB-node is switched to a new parent node, transmission paths of all data are transferred from the source parent node of the IAB-node to the new parent node thereof, a donor-DU is changed from the source donor-DU into the target donor-DU. Regardless of whether the migrated IAB-node and a descendant node are configured with the TNL address allocated by the target donor-DU, discarding uplink data and downlink data occurs, and TNL tunnel transmission between the target donor-DU and the source Donor-DU is required.

In some embodiments, the second donor distributed unit receives a TNL tunnel transmission setup request transmitted by a donor centralized unit, the TNL tunnel transmission setup request including an endpoint TNL address of a TNL tunnel of the first donor distributed unit, wherein the TNL tunnel transmission setup request is used to request the second donor distributed unit to set up a TNL tunnel or activate the TNL tunnel transmission of uplink data.

For example, after the donor centralized unit receives a switching completion message of the migrated IAB-node, or after the donor centralized unit receives an RRC reestablishment completion message of the migrated IAB-node, or when the donor centralized unit does not configure the TNL address allocated by the second donor distributed unit for the migrated IAB-node or its descendant node, the second donor distributed unit receives a TNL tunnel transmission setup request transmitted by the donor centralized unit.

In some embodiments, the TNL tunnel transmission setup request further includes at least one of the following: a source TNL address of an uplink F1 user plane needing to activate the TNL tunnel transmission, a source TNL address of an uplink F1 control plane needing to activate the TNL tunnel transmission, or a source TNL address of uplink non-F1 data needing to activate the TNL tunnel transmission.

For example, a donor-CU transmits the TNL tunnel transmission setup request to the target donor-DU. The TNL tunnel transmission setup request includes an endpoint TNL address of a TNL tunnel at a source donor-DU side; moreover, the TNL tunnel transmission setup request may further include a source TNL address of an uplink F1 user plane, a source TNL address of an uplink F1 control plane, and a source TNL address of uplink non-F1 data. F1 here includes an F1 connection of the migrated IAB-node and its descendant node.

In some embodiments, a second donor distributed unit transmits a TNL tunnel transmission setup response to a donor centralized unit, the TNL tunnel transmission setup response including an endpoint TNL address of a TNL tunnel of the second donor distributed unit.

In some embodiments, the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

For example, the target donor-DU transmits the TNL tunnel transmission setup response to the donor-CU. The TNL tunnel transmission setup response includes an endpoint TNL address of a TNL tunnel at a target donor-DU side; moreover, the TNL tunnel transmission setup response may further include a source TNL address of an uplink F1 user plane successfully activating the TNL tunnel transmission, a source TNL address of an uplink F1 control plane, a source TNL address of uplink non-F1 data, a source TNL address failing in being activated.

Figure 10:
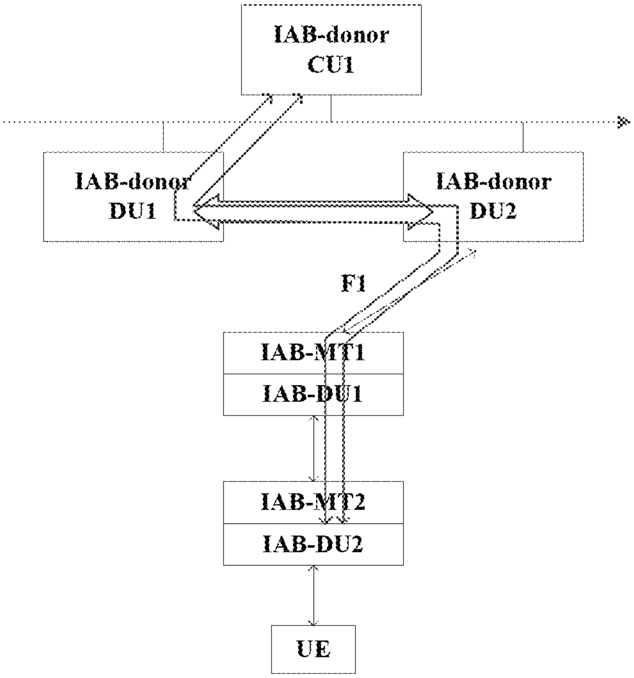
FIG. 10 is an exemplary diagram of activating a TNL tunnel in the embodiments of the present disclosure.

FIG. 10 is an exemplary diagram of activating a TNL tunnel in the embodiments of the present disclosure. As shown in FIG. 10, after TNL tunnel transmission of the target donor-DU is established, the target donor-DU transmits to the source donor-DU uplink data (the source TNL address is the TNL address allocated by the source Donor-DU) configured in the TNL tunnel transmission setup request via the TNL tunnel, and then the uplink data may be routed from the source donor-DU to the donor-CU.

In some embodiments, a second donor distributed unit further receives service mapping information transmitted by a donor centralized unit, the service mapping information being used to configure a backhaul adaptive protocol (BAP) routing identifier of downlink data transmitted via a TNL tunnel and a backhaul RLC channel between the second donor distributed unit and a next hop of descendant node.

For example, for the target donor-DU, the donor-CU further configures service mapping information for downlink data that is activated and is transmitted via the TNL tunnel. The service mapping information includes a BAP target address and path identifier corresponding to the TNL address of the downlink data and a Differentiated Services Code Point (DSCP), and an identifier of a backhaul RLC channel between the target donor-DU and a next hop of IAB-node, to which the TNL address of the downlink data and the DSCP are mapped, so as to facilitate the target Donor-DU to transmit downlink data transmitted by these TNL tunnels to a migrated IAB-node or its descendant node.

After the donor-CU configures to the IAB-node the TNL address allocated by the target donor-DU (i.e., the TNL address that may be routed via the target donor-DU), uplink data carrying the TNL address allocated by the target donor-DU is not discarded by the target donor-DU, i.e., the uplink data may be successfully transmitted to the donor-CU without TNL tunnel transmission, the donor-CU may trigger an update or release the TNL tunnel transmission for the relevant uplink data. The IAB-node includes a migrated IAB-node or its descendant node.

In some embodiments, a second donor distributed unit receives a TNL tunnel transmission update or release request transmitted by the donor centralized unit, the TNL tunnel transmission update or release request including an endpoint TNL address of a TNL tunnel of a first donor distributed unit, and being used to request the second donor distributed unit to deactivate TNL tunnel transmission of the uplink data or release the TNL tunnel.

In some embodiments, after the donor centralized unit configures for the IAB-node a TNL address allocated by the second donor distributed unit, or after the migrated IAB-node completes a preset time of switching, or after the migrated IAB-node completes a preset time of reestablishment, the second donor distributed unit receives the TNL tunnel transmission update or release request transmitted by the donor centralized unit.

For example, if during a switching process of the migrated IAB-node, the donor-CU configures for the migrated IAB-node a TNL address for F1-C and non-F1 data that may be routed via the target donor-DU, after completing a preset time of switching, the donor-CU deactivates TNL tunnel transmission for F1-C and non-F1 data of the migrated IAB-node.

For another example, after completing switching, the donor-CU configures for the migrated IAB-node a TNL address for F1-U data that may be routed via the target donor-DU through an RRC reconfiguration message, after a preset time of completing the RRC reconfiguration, the donor-CU deactivates TNL tunnel transmission for F1-U of the migrated IAB-node.

In order to successfully route uplink inflight data to the donor-CU respectively via the TNL tunnel, after the donor-CU configures for the IAB-node a preset time of a TNL address allocated by the target donor-DU, the TNL tunnel transmission update or release is then triggered.

In some embodiments, the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, or a source TNL address of the uplink non-F1 data needing to deactivate the TNL tunnel transmission.

For example, the donor-CU transmits a TNL tunnel transmission update or release request to the target donor-DU; the TNL tunnel transmission update or release request includes an endpoint TNL address of a TNL tunnel at a source donor-DU side; moreover, the TNL tunnel transmission update or release request may further include a source TNL address of the uplink F1 user plane needing to deactivate the tunnel transmission, a source TNL address of the uplink F1 control plane needing to deactivate the tunnel transmission, a source TNL address of the uplink non-F1 data needing to deactivate the tunnel transmission. F1 here includes an F1 connection of the migrated IAB-node and its descendant node.

In some embodiments, a second donor distributed unit transmits a TNL tunnel transmission update or release response to a donor centralized unit, the TNL tunnel transmission update or release response including an endpoint TNL address of a TNL tunnel of the second donor distributed unit.

In some embodiments, the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

For example, the target donor-DU transmits a TNL tunnel transmission update or release response to the donor-CU; the TNL tunnel transmission update or release response includes an endpoint TNL address of a TNL tunnel at the target donor-DU side; moreover, the TNL tunnel transmission update or release response may further include a source TNL address of an uplink F1 user plane successfully deactivating the tunnel transmission, a source TNL address of an uplink F1 control plane successfully deactivating the tunnel transmission, a source TNL address of uplink non-F1 data successfully deactivating the tunnel transmission, a source TNL address failing in being deactivated.

Figure 11:
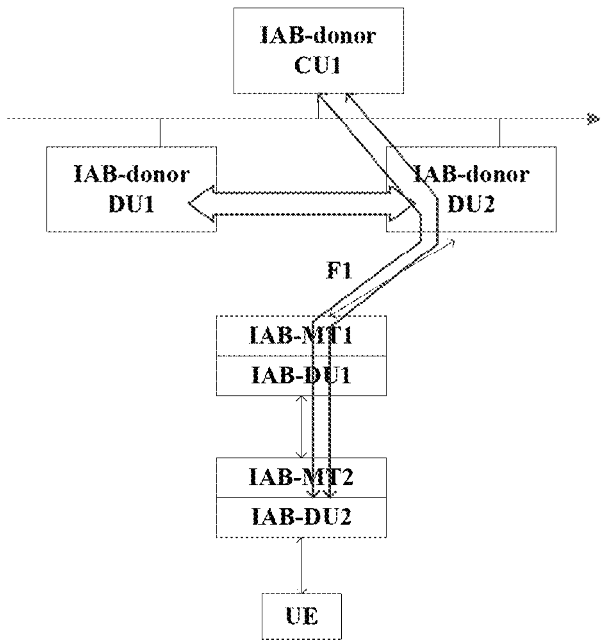
FIG. 11 is an exemplary diagram of deactivating a TNL tunnel in the embodiments of the present disclosure.

FIG. 11 is an exemplary diagram of deactivating a TNL tunnel in the embodiments of the present disclosure. As shown in FIG. 11, after TNL tunnel transmission update or release of the target donor-DU, the target donor-DU does not transmit to the source donor-DU uplink data (the source TNL address is the TNL address allocated by the source Donor-DU) configured in the TNL tunnel transmission update or release request and removed from TNL tunnel transmission via the TNL tunnel, but directly discards such uplink data.

In some embodiments, a second donor distributed unit further receives a service mapping information release indication transmitted by a donor centralized unit, the service mapping information release indication being used to release configuration of a BAP routing identifier of downlink data deactivated TNL tunnel transmission and configuration of a backhaul RLC channel between the second donor distributed unit and the next hop of descendant node.

For example, after being configured with a TNL address allocated by the target donor-DU, the IAB-node may further transmit an applied TNL address of uplink data and downlink data to the donor-CU via an F1 connection control plane signaling (F1AP). For example, an applied TNL address, allocated by the target donor-DU, respectively for an F1 user plane, an F1 control plane and non-F1 data and a TNL address previously used by these data (a TNL address allocated by the source donor-DU) may be transmitted to the donor-CU. In this way, the donor-CU triggers a request for the target donor-DU and the source donor-DU to remove these data from the TNL tunnel transmission.

In addition, in the target donor-DU, the donor-CU further needs to reconfigure service mapping information for downlink data that is configured with an TNL address allocated by the target donor-DU, including configuring a BAP target address and a path identifier corresponding to a new TNL address of the downlink data and DSCP, and an identifier of a backhaul RLC channel between the target donor-DU and a next hop of IAB-node, to which the TNL address of the downlink data and the DSCP are mapped. And, the donor-CU needs to further remove previous service mapping information.

Then, uplink data transmission in an intra-donor CU dual connection scenario (may be called Scenario 2) is described.

In some embodiments, the IAB node performs multi-path distribution in the donor centralized unit (intra-donor CU), and the first donor distributed unit and the second donor distributed unit belong to the same donor centralized unit (donor-CU).

In other words, when the IAB-node performs intra-donor CU multi-path distribution (intra-donor CU topology redundancy), TNL tunnel transmission is performed between the source donor-DU and the target donor-DU. For example, when a migrated IAB-node is accessed to a new parent node, a transmission path of one part of data is transferred from the source parent node of the IAB-node to the new parent node, the donor-DU is changed from the source donor-DU into the target donor-DU; while a transmission path of the other part of data is still transmitted via the source parent node and the source donor-DU. For data whose transmission path is migrated to the target donor-DU, if a TNL address allocated by the target donor-DU is not configured, uplink data and downlink data is discarded, and TNL tunnel transmission between the target donor-DU and the source Donor-DU is required.

In some embodiments, the second donor distributed unit receives a TNL tunnel transmission setup request transmitted by a donor centralized unit, the TNL tunnel transmission setup request including an endpoint TNL address of the TNL tunnel of the first donor distributed unit, wherein the TNL tunnel transmission setup request is used to request the second donor distributed unit to set up a TNL tunnel or activate the TNL tunnel transmission of uplink data.

In some embodiments, in a case where a donor centralized unit configures a backhaul adaptive protocol (BAP) routing of an IAB-node as a BAP routing identifier of the second donor distributed unit but does not configure a TNL address allocated by the second donor distributed unit, the second donor distributed unit receives the TNL tunnel transmission setup request transmitted by the donor centralized unit. The IAB node includes a migrated IAB-node or its descendant node.

For example, when the donor-CU configures BAP routing of an uplink F1 control plane and non-F1 data of an IAB-node as a BAP address and path identifier of the target donor-DU, or when the donor-CU configures for the IAB-node a BAP address that may be routed by the target donor-DU and routes a downlink F1 control plane and non-F1 data of the IAB-node to the IAB-node from the target donor-DU, but does not configure for the IAB-node a TNL address allocated by the target donor-DU, the donor-CU triggers setup of TNL tunnel transmission.

In some embodiments, the TNL tunnel transmission setup request further includes at least one of the following: a source TNL address of the uplink F1 user plane needing to activate the TNL tunnel transmission, a source TNL address of the uplink F1 control plane needing to activate the TNL tunnel transmission, a source TNL address of the uplink non-F1 data needing to activate the TNL tunnel transmission, or a GTP Tunnel Endpoint Identifier (TEID) of the uplink F1 user plane needing to activate the TNL tunnel transmission.

For example, the donor-CU transmits a TNL tunnel transmission setup request to the target donor-DU; the TNL tunnel transmission setup request includes an endpoint TNL address of a TNL tunnel at a source donor-DU side; moreover, the TNL tunnel transmission setup request may further include a source TNL address of the uplink F1 user plane needing tunnel transmission, a source TNL address of the uplink F1 control plane needing the tunnel transmission, a source TNL address of the uplink non-F1 data needing the tunnel transmission.

F1 here includes an F1 connection of the migrated IAB-node and its descendant node. It should be noted that because the minimum granularity of uplink F1 user plane path distribution is a UE bearer, and different UE bearers use different GTP-U tunnels, and when requesting TNL tunnel transmission of an uplink F1 user plane, UL GTP TEID further needs to be indicated in addition to indicating a source TNL address.

In some embodiments, a second donor distributed unit transmits a TNL tunnel transmission setup response to a donor centralized unit, the TNL tunnel transmission setup response including an endpoint TNL address of a TNL tunnel of the second donor distributed unit.

In some embodiments, the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

For example, the target donor-DU transmits a TNL tunnel transmission setup response to the donor-CU; the TNL tunnel transmission setup response includes an endpoint TNL address of a TNL tunnel at the target donor-DU side; moreover, the TNL tunnel transmission setup response may further include a source TNL address of an uplink F1 user plane successfully activating the tunnel transmission, a source TNL address of an uplink F1 control plane successfully activating the tunnel transmission, a source TNL address of uplink non-F1 data successfully activating the tunnel transmission, a source TNL address failing in being activated.

Figure 12:
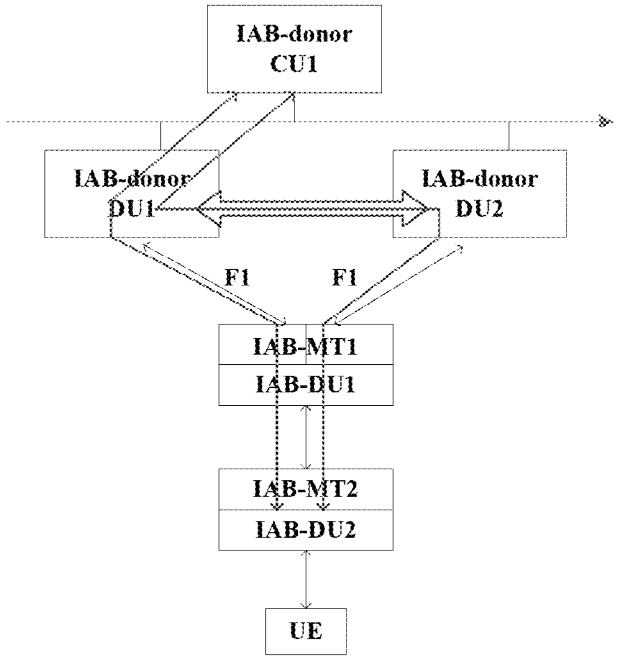
FIG. 12 is another exemplary diagram of activating a TNL tunnel in the embodiments of the present disclosure.

FIG. 12 is an exemplary diagram of activating a TNL tunnel in the embodiments of the present disclosure. As shown in FIG. 12, after TNL tunnel transmission of the target donor-DU is established, the target donor-DU transmits to the source donor-DU uplink data configured in the TNL tunnel transmission setup request (the source TNL address is the TNL address allocated by the source Donor-DU) via the TNL tunnel, and then the uplink data may be routed from the source donor-DU to the donor-CU.

In some embodiments, a second donor distributed unit further receives service mapping information configured by a donor centralized unit, the service mapping information being used to configure a BAP routing identifier of downlink data transmitted via a TNL tunnel and a backhaul RLC channel between the second donor distributed unit and a next hop of descendant node.

For example, for the target donor-DU, the donor-CU further configures, for a target TNL address configured in a TNL tunnel transmission setup request, service mapping information of downlink data of a TNL address allocated for the source Donor-DU, including a BAP target address and a path identifier corresponding to the TNL address of the downlink data and DSCP, and an identifier of a backhaul RLC channel between the target donor-DU and a next hop of IAB-node, to which the TNL address of the downlink data and the DSCP are mapped, so as to facilitate the target Donor-DU to transmit downlink data transmitted by these TNL tunnels to a migrated IAB-node or its descendant node.

In some embodiments, a second donor distributed unit receives a TNL tunnel transmission update or release request transmitted by a donor centralized unit, the TNL tunnel transmission update or release request including an endpoint TNL address of a TNL tunnel of a first donor distributed unit, and being used to request the second donor distributed unit to deactivate TNL tunnel transmission of the uplink data or release the TNL tunnel.

In some embodiments, after the donor centralized unit configures for the IAB-node a TNL address allocated by the second donor distributed unit, the second donor distributed unit receives a TNL tunnel transmission update or release request transmitted by the donor centralized unit.

For example, after a TNL address allocated by the target donor-DU (i.e., a TNL address that may be routed by the target donor-DU) is configured for data migrated from the IAB-node to the target donor-CU side, uplink data and downlink data carrying the TNL address allocated by the target donor-DU may be successfully transmitted to the donor-CU or IAB-node without needing TNL transmission, the donor-CU may trigger an update or release the TNL tunnel transmission for the relevant uplink data and downlink data.

For another example, if a migrated IAB-node is connected to a new parent node, after establishing a dual connection with the new parent node, its F1 control plane data and non-F1 data are migrated to the target donor-DU, and when the donor-CU configures, for the F1 control plane and the non-F1 data of the migrated IAB-node, a TNL address allocated by the target donor-DU, the donor-CU deactivates TNL tunnel transmission of F1-C and non-F1 data of the migrated IAB-node.

In some embodiments, the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, a source TNL address of the uplink non-F1 data needing to deactivate the TNL tunnel transmission, or a GTP TEID of the uplink F1 user plane needing to deactivate the TNL tunnel transmission.

For example, the donor-CU transmits a TNL tunnel transmission update or release request to the target donor-DU; the TNL tunnel transmission update or release request includes an endpoint TNL address of a TNL tunnel at a source donor-DU side; moreover, the TNL tunnel transmission update or release request may further include a source TNL address of the uplink F1 user plane needing to deactivate the tunnel transmission, a source TNL address of the uplink F1 control plane needing to deactivate the tunnel transmission, a source TNL address of the uplink non-F1 data needing to deactivate the tunnel transmission. F1 here includes an F1 connection of the migrated IAB-node and its descendant node.

In some embodiments, a second donor distributed unit transmits a TNL tunnel transmission update or release response to a donor centralized unit, the TNL tunnel transmission update or release response including an endpoint TNL address of a TNL tunnel of the second donor distributed unit.

In some embodiments, the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

For example, the target donor-DU transmits a TNL tunnel transmission update or release response to the donor-CU; the TNL tunnel transmission update or release response includes an endpoint TNL address of a TNL tunnel at the target donor-DU side; moreover, the TNL tunnel transmission update or release response may further include a source TNL address of an uplink F1 user plane successfully deactivating the tunnel transmission, a source TNL address of an uplink F1 control plane successfully deactivating the tunnel transmission, a source TNL address of uplink non-F1 data successfully deactivating the tunnel transmission, a source TNL address failing in being deactivated.

Figure 13:
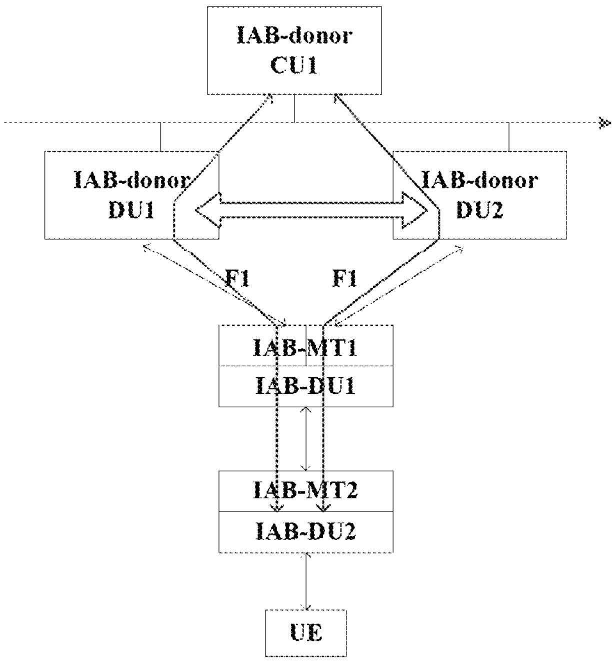
FIG. 13 is another exemplary diagram of deactivating a TNL tunnel in the embodiments of the present disclosure.

FIG. 13 is an exemplary diagram of deactivating a TNL tunnel in the embodiments of the present disclosure. As shown in FIG. 13, after TNL tunnel transmission update or release of the target donor-DU, the target donor-DU does not transmit uplink data removed from TNL tunnel transmission to the source donor-DU via the TNL tunnel, but directly discards such uplink data.

In some embodiments, a second donor distributed unit further receives a service mapping information release indication transmitted by a donor centralized unit, the service mapping information release indication being used to release configuration of a BAP routing identifier of downlink data deactivated the TNL tunnel transmission and configuration of a backhaul RLC channel between the second donor distributed unit and the next hop of descendant node.

For example, after being configured with a TNL address allocated by the target donor-DU, the IAB-node may further transmit an applied TNL address of uplink data and downlink data to the donor-CU via an F1 connection control plane signaling (F1AP). For example, an applied TNL address, allocated by the target donor-DU, respectively for an F1 user plane, an F1 control plane and non-F1 data and a TNL address previously used by these data (a TNL address allocated by the source donor-DU) may be transmitted to the donor-CU. In this way, the donor-CU triggers a request for the target donor-DU and the source donor-DU to remove these data from the TNL tunnel transmission.

In addition, in the target donor-DU, the donor-CU further reconfigures service mapping information for downlink data that is configured with an TNL address allocated by the target donor-DU, including configuring a BAP target address and a path identifier corresponding to the TNL address of the downlink data and DSCP, and an identifier of a backhaul RLC channel between the target donor-DU and a next hop of IAB-node, to which the TNL address of the downlink data and the DSCP are mapped. And, the donor-CU further removes service mapping information before such downlink data (i.e., when being transmitted via a TNL tunnel).

Uplink data transmission in an inter-donor CU migration scenario (for example, called Scenario 3) is described.

In some embodiments, an IAB node switches from a first donor distributed unit to a second donor distributed unit, or RRC is reestablished to the second donor distributed unit after a radio link failure (RLF) from the IAB node to the first donor distributed unit, the first donor distributed unit belonging to a first donor centralized unit, and the second donor distributed unit belonging to a second donor centralized unit.

In other words, when the IAB-node performs inter-donor-CU migration, TNL tunnel transmission is performed between the source donor-DU and the target donor-DU. The source donor-DU is controlled by the source donor-CU, the target donor-DU is controlled by the target donor-CU.

For example, when the migrated IAB-node is switched to the target donor-CU, transmission paths of all data are transferred from the source donor-CU side of the IAB-node to the target donor-CU side, the donor-DU is changed from the source donor-DU into the target donor-DU. Regardless of whether the migrated IAB-node and a descendant node are configured with the TNL address allocated by the target donor-DU, discarding uplink data and downlink data occurs, TNL tunnel transmission between the target donor-DU and the source Donor-DU is required.

In some embodiments, the second donor distributed unit receives a TNL tunnel transmission setup request transmitted by a second donor centralized unit, the TNL tunnel transmission setup request including an endpoint TNL address of the TNL tunnel of the first donor distributed unit, wherein the TNL tunnel transmission setup request is used to request the second donor distributed unit to set up a TNL tunnel or activate the TNL tunnel transmission of uplink data.

In some embodiments, after the second donor centralized unit receives a switching completion message of the IAB-node, or after the second donor centralized unit receives an RRC reestablishment completion message of the IAB-node, or when the second donor centralized unit does not configure the TNL address allocated by the second donor distributed unit for the IAB-node, the second donor distributed unit receives a TNL tunnel transmission setup request transmitted by the second donor centralized unit.

For example, a Handover Request message transmitted by the source donor-CU to the target donor-CU for an migrated IAB-node includes an endpoint TNL address of a TNL tunnel of the source donor-DU side, a TNL address allocated by the source donor-DU and used by an F1 user plane, an F1 control plane and non-F1 data of the migrated IAB-node, or further includes a TNL address allocated by the source donor-DU and used by an F1 user plane, an F1 control plane and non-F1 data of a descendant node of the migrated IAB-node. A Handover Response message transmitted by the target donor-CU to the source donor-CU for a migrated IAB-node includes an endpoint TNL address of a TNL tunnel of the target donor-DU side.

In some embodiments, the TNL tunnel transmission setup request further includes at least one of the following: a source TNL address of an uplink F1 user plane needing to activate the TNL tunnel transmission, a source TNL address of an uplink F1 control plane needing to activate the TNL tunnel transmission, or a source TNL address of uplink non-F1 data needing to activate the TNL tunnel transmission.

For example, the target donor-CU receives a switching completion message transmitted by the migrated IAB-node, and transmits a TNL tunnel transmission setup request to the target donor-DU. The TNL tunnel transmission setup request includes an endpoint TNL address of a TNL tunnel at a source donor-DU side; moreover, the TNL tunnel transmission setup request may further include a source TNL address of an uplink F1 user plane, a source TNL address of an uplink F1 control plane, and a source TNL address of uplink non-F1 data. F1 here includes an F1 connection of the migrated IAB-node and its descendant node.

In some embodiments, a second donor distributed unit transmits a TNL tunnel transmission setup response to a second donor centralized unit, the TNL tunnel transmission setup response including an endpoint TNL address of a TNL tunnel of the second donor distributed unit.

In some embodiments, the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

For example, the target donor-DU transmits the TNL tunnel transmission setup response to the target donor-CU. The TNL tunnel transmission setup response includes an endpoint TNL address of a TNL tunnel at the target donor-DU side; moreover, the TNL tunnel transmission setup response may further include a source TNL address of an uplink F1 user plane successfully activating the tunnel transmission, a source TNL address of an uplink F1 control plane successfully activating the tunnel transmission, a source TNL address of uplink non-F1 data successfully activating the tunnel transmission, a source TNL address failing in being activated.

Figure 14:
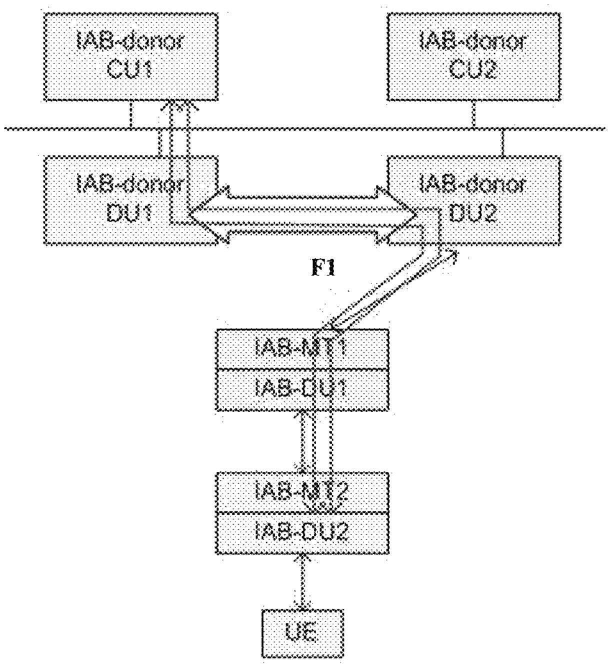
FIG. 14 is another exemplary diagram of activating a TNL tunnel in the embodiments of the present disclosure.

FIG. 14 is an exemplary diagram of activating a TNL tunnel in the embodiments of the present disclosure. As shown in FIG. 14, after TNL tunnel transmission of the target donor-DU is established, the target donor-DU transmits to the source donor-DU uplink data configured in the TNL tunnel transmission setup request (the source TNL address is the TNL address allocated by the source Donor-DU) via the TNL tunnel, and then the uplink data may be routed from the source donor-DU to the donor-CU.

In some embodiments, a second donor distributed unit further receives service mapping information transmitted by a donor centralized unit, the service mapping information being used to configure a BAP routing identifier of downlink data transmitted via a TNL tunnel and a backhaul RLC channel between the second donor distributed unit and a next hop of descendant node.

For example, for the target donor-DU, the target donor-CU needs to configure, for a target TNL address configured in a TNL tunnel transmission setup request, service mapping information of downlink data of a TNL address allocated for the source Donor-DU, including a BAP target address and a path identifier corresponding to the TNL address of the downlink data and DSCP, and an identifier of a backhaul RLC channel between the target donor-DU and a next hop of IAB-node, to which the TNL address of the downlink data and the DSCP are mapped, so as to facilitate the target Donor-DU to transmit downlink data transmitted by these TNL tunnels to a migrated IAB-node or its descendant node. Thus, the source donor-CU further needs to transmit DSCP of a downlink service of the migrated IAB-node or its descendant node to the target donor-CU, for example via a Handover Request message.

After the target donor-CU configures a TNL address allocated by the target donor-DU (i.e., a TNL address that may be routed by the target donor-DU) for the IAB-node, uplink data and downlink data carrying the TNL address allocated by the target donor-DU may be successfully transmitted to the source donor-CU or IAB-node without needing TNL transmission, the target donor-CU may trigger an update or release the TNL tunnel transmission for the relevant uplink data, and the source donor-CU may trigger an update or release the TNL tunnel transmission for the downlink data.

In some embodiments, a second donor distributed unit receives a TNL tunnel transmission update or release request transmitted by a second donor centralized unit, the TNL tunnel transmission update or release request including an endpoint TNL address of a TNL tunnel of a first donor distributed unit, and being used to request the second donor distributed unit to deactivate TNL tunnel transmission of the uplink data or release the TNL tunnel.

In some embodiments, after the second donor centralized unit configures for an migrated IAB-node or its descendant node a TNL address allocated by the second donor distributed unit, or after the migrated IAB-node completes a preset time of switching, or after the migrated IAB-node completes a preset time of reestablishment, the second donor distributed unit receives the TNL tunnel transmission update or release request transmitted by the second donor centralized unit.

For example, if during a switching process of the migrated IAB-node, the target donor-CU configures for the migrated IAB-node a TNL address for F1-C and non-F1 data that may be routed via the target donor-DU, after completing a preset time of switching, the target donor-CU and the source donor-CU deactivate TNL tunnel transmission for F1-C and non-F1 data of the migrated IAB-node.

For another example, after completing switching, the target donor-CU configures for the migrated IAB-node a TNL address for F1-U data that may be routed via the target donor-DU through an RRC reconfiguration message, after a preset time of completing the RRC reconfiguration, the target donor-CU and the source donor-CU deactivate TNL tunnel transmission for F1-U of the migrated IAB-node.

In order to successfully route uplink inflight data to the source donor-CU via the TNL tunnel, after the target donor-CU configures for the IAB-node a preset time of a TNL address allocated by the target donor-DU, the TNL tunnel transmission update or release is then triggered.

In some embodiments, the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, or a source TNL address of the uplink non-F1 data needing to deactivate the TNL tunnel transmission.

For example, the target donor-CU transmits a TNL tunnel transmission update or release request to the target donor-DU. The TNL tunnel transmission update or release request includes an endpoint TNL address of a TNL tunnel at a source donor-DU side; moreover, the TNL tunnel transmission update or release request may further include a source TNL address of the uplink F1 user plane needing to deactivate the TNL tunnel transmission, a source TNL address of the uplink F1 control plane needing to deactivate the TNL tunnel transmission, a source TNL address of the uplink non-F1 data needing to deactivate the TNL tunnel transmission. F1 here includes an F1 connection of the migrated IAB-node and its descendant node.

In some embodiments, a second donor distributed unit transmits a TNL tunnel transmission update or release response to a second donor centralized unit, the TNL tunnel transmission update or release response including an endpoint TNL address of a TNL tunnel of the second donor distributed unit.

In some embodiments, the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

For example, the target donor-DU transmits a TNL tunnel transmission update or release response to the target donor-CU. The TNL tunnel transmission update or release response includes an endpoint TNL address of a TNL tunnel at the target donor-DU side; moreover, the TNL tunnel transmission update or release response may further include a source TNL address of an uplink F1 user plane successfully deactivating the tunnel transmission, a source TNL address of an uplink F1 control plane successfully deactivating the tunnel transmission, a source TNL address of uplink non-F1 data successfully deactivating the tunnel transmission, a source TNL address failing in being deactivated.

Figure 15:
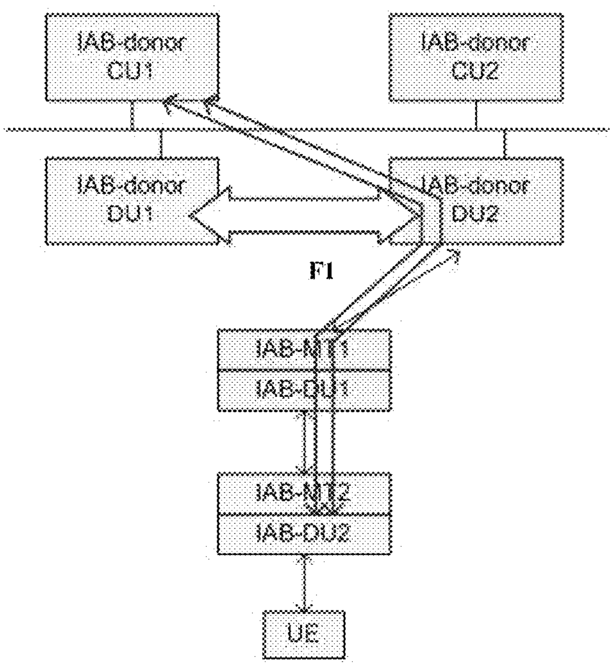
FIG. 15 is another exemplary diagram of deactivating a TNL tunnel in the embodiments of the present disclosure.

FIG. 15 is an exemplary diagram of deactivating a TNL tunnel in the embodiments of the present disclosure. As shown in FIG. 15, after TNL tunnel transmission update or release of the target donor-DU, the target donor-DU does not transmit to the source donor-DU uplink data deactivated the TNL tunnel transmission (the source TNL address is the TNL address allocated by the source Donor-DU) via the TNL tunnel, but directly discards such uplink data.

In some embodiments, a second donor distributed unit further receives a service mapping information release indication transmitted by a donor centralized unit, the service mapping information release indication being used to release configuration of a BAP routing identifier of downlink data deactivated the TNL tunnel transmission and configuration of a backhaul RLC channel between the second donor distributed unit and the next hop of descendant node.

For example, after being configured with a TNL address allocated by the target donor-DU, the IAB-node may further transmit an applied TNL address of uplink data and downlink data to the source donor-CU via an F1 connection control plane signaling (F1AP). For example, an applied TNL address, allocated by the target donor-DU, respectively for an F1 user plane, an F1 control plane and non-F1 data and a TNL address previously used by these data (a TNL address allocated by the source donor-DU) may be transmitted to the source donor-CU. In this way, the source donor-CU and the target donor-DU respectively trigger a request for the source donor-DU and the target donor-DU to remove these data from the TNL tunnel transmission.

In addition, in the target donor-DU, the target donor-CU further needs to reconfigure service mapping information for downlink data that is configured with an TNL address allocated by the target donor-DU, including configuring a BAP target address and a path identifier corresponding to the TNL address of the downlink data and DSCP, and an identifier of a backhaul RLC channel between the target donor-DU and a next hop of IAB-node, to which a new TNL address of the downlink data and the DSCP are mapped. And, the donor-CU further needs to remove service mapping information before such downlink data.

Uplink data transmission in an inter-donor CU dual connection scenario (for example, called Scenario 4) is then described.

In some embodiments, the IAB node performs multi-path distribution across the donor centralized units (inter-donor CU), the first donor distributed unit belongs to a first donor centralized unit, and the second donor distributed unit belongs to a second donor centralized unit.

In other words, when a migrated IAB-node performs inter-donor CU multi-path distribution (inter-donor-CU topology redundancy), TNL tunnel transmission is performed between the source donor-DU and the target donor-DU. For example, when the migrated IAB-node is accessed to the target donor-CU, a transmission path of one part of data is transferred from the source donor-CU side of the IAB-node to the target donor-CU side, the donor-DU is changed from the source donor-DU into the target donor-DU; while a transmission path of the other part of data is still transmitted via the source parent node and the source donor-DU. For data whose transmission path is migrated to the target donor-DU, if a TNL address allocated by the target donor-DU is not configured, uplink data and downlink data is discarded, and TNL tunnel transmission between the target donor-DU and the source Donor-DU is required.

In some embodiments, the second donor distributed unit receives a TNL tunnel transmission setup request transmitted by a second donor centralized unit, the TNL tunnel transmission setup request including an endpoint TNL address of the TNL tunnel of the first donor distributed unit, wherein the TNL tunnel transmission setup request is used to request the second donor distributed unit to set up a TNL tunnel or activate the TNL tunnel transmission of uplink data.

In some embodiments, in a case where a second donor centralized unit configures a backhaul adaptive protocol (BAP) routing of an IAB-node as a BAP routing identifier of the second donor distributed unit but does not configure a TNL address allocated by the second donor distributed unit, the second donor distributed unit receives the TNL tunnel transmission setup request transmitted by the second donor centralized unit.

For example, the source donor-CU transmits to the target donor-CU an endpoint TNL address of a TNL tunnel of the source donor-DU side, an uplink F1 user plane, an F1 control plane or non-F1 data of the migrated IAB-node or a descendant node which requests migration to the target donor-CU side, and a TNL address allocated by the source donor-DU to these data. For example, via a SgNB node addition request message or a SgNB node modification request for the migrated IAB-node.

The target donor-CU transmits to the source donor-CU an endpoint TNL address of a TNL tunnel of the target donor-DU side, for example via a SgNB node addition response message or a SgNB node modification response message for the migrated IAB-node.

When a transmission path of IAB-node data is transferred to the target donor-CU side, i.e., when the target donor-CU configures BAP routing of an uplink F1 control plane and non-F1 data of the IAB-node as a BAP address and path identifier of the target donor-DU but does not configure a TNL address allocated by the target donor-DU for uplink F1 control data and non-F1 data, the target donor-CU and the source donor-CU trigger establishment of TNL tunnel transmission.

In some embodiments, the TNL tunnel transmission setup request further includes at least one of the following: a source TNL address of the uplink F1 user plane needing to activate the TNL tunnel transmission, a source TNL address of the uplink F1 control plane needing to activate the TNL tunnel transmission, a source TNL address of the uplink non-F1 data needing to activate the TNL tunnel transmission, or a GTP TEID of the uplink F1 user plane needing to activate the TNL tunnel transmission.

For example, the target donor-CU transmits the TNL tunnel transmission setup request to the target donor-DU. The TNL tunnel transmission setup request includes an endpoint TNL address of a TNL tunnel at a source donor-DU side; moreover, the TNL tunnel transmission setup request may further include a source TNL address of an uplink F1 user plane, a source TNL address of an uplink F1 control plane, and a source TNL address of uplink non-F1 data.

F1 here includes an F1 connection of the migrated IAB-node and its descendant node. It should be noted that because the minimum granularity of uplink F1 user plane path distribution is a UE bearer, and when requesting tunnel transmission of an uplink F1 user plane, UL GTP TEID further needs to be indicated in addition to a source TNL address.

In some embodiments, a second donor distributed unit transmits a TNL tunnel transmission setup response to a second donor centralized unit, the TNL tunnel transmission setup response including an endpoint TNL address of a TNL tunnel of the second donor distributed unit.

In some embodiments, the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

For example, the target donor-DU transmits the TNL tunnel transmission setup response to the target donor-CU. The TNL tunnel transmission setup response includes an endpoint TNL address of a TNL tunnel at the target donor-DU side; moreover, the TNL tunnel transmission setup response may further include a source TNL address of an uplink F1 user plane successfully activating the tunnel transmission, a source TNL address of an uplink F1 control plane successfully activating the tunnel transmission, a source TNL address of uplink non-F1 data successfully activating the tunnel transmission, a source TNL address failing in being activated.

Figure 16:
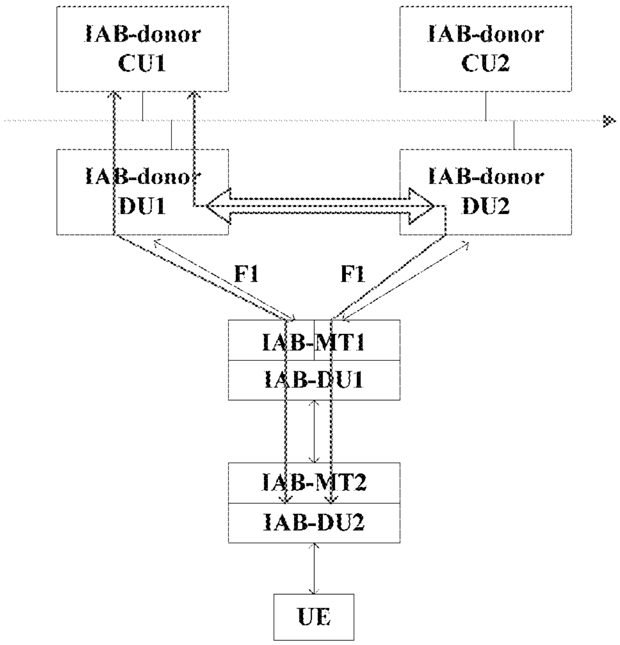
FIG. 16 is another exemplary diagram of activating a TNL tunnel in the embodiments of the present disclosure.

FIG. 16 is an exemplary diagram of activating a TNL tunnel in the embodiments of the present disclosure. As shown in FIG. 16, after TNL tunnel transmission of the target donor-DU is established, the target donor-DU transmits to the source donor-DU uplink data configured in the TNL tunnel transmission setup request (the source TNL address is the TNL address allocated by the source Donor-DU) via the TNL tunnel, and then the uplink data may be routed from the source donor-DU to the donor-CU.

In some embodiments, a second donor distributed unit further receives service mapping information transmitted by a donor centralized unit, the service mapping information being used to configure a BAP routing identifier of downlink data transmitted via a TNL tunnel and a backhaul RLC channel between the second donor distributed unit and a next hop of descendant node.

For example, for the target donor-DU, the target donor-CU further configures service mapping information of downlink data activating the TNL tunnel transmission, including a BAP target address and a path identifier corresponding to the TNL address of the downlink data and DSCP, and an identifier of a backhaul RLC channel between the target donor-DU and a next hop of IAB-node, to which the TNL address of the downlink data and the DSCP are mapped, so as to facilitate the target Donor-DU to transmit downlink data transmitted by these TNL tunnels to a migrated IAB-node or its descendant node. Thus, the source donor-CU further transmits DSCP of a downlink service requesting to be migrated to the target donor-CU side to the target donor-CU, for example via a SgNB node addition response message or a SgNB node modification response message.

In some embodiments, a second donor distributed unit receives a TNL tunnel transmission update or release request transmitted by a second donor centralized unit, the TNL tunnel transmission update or release request including an endpoint TNL address of a TNL tunnel of a first donor distributed unit, and being used to request the second donor distributed unit to deactivate TNL tunnel transmission of the uplink data or release the TNL tunnel.

For example, after the target donor-CU configures a TNL address allocated by the target donor-DU (i.e., a TNL address that may be routed by the target donor-DU) for the IAB-node, uplink data and downlink data carrying the TNL address allocated by the target donor-DU may be successfully transmitted to the source donor-CU or IAB-node without needing TNL transmission, the target donor-CU may trigger an update or release the TNL tunnel transmission for the relevant uplink data, and the source donor-CU may trigger an update or release the TNL tunnel transmission for the downlink data.

In some embodiments, after the second donor centralized unit configures for the IAB-node a TNL address allocated by the second donor distributed unit, the second donor distributed unit receives a TNL tunnel transmission update or release request transmitted by the second donor centralized unit.

For example, if the migrated IAB-node is connected to a new parent node, after a dual connection is established with the new parent node, F1 control plane data and non-F1 data are migrated to the target donor-DU. When the donor-CU configures, for the F1 control plane and the non-F1 data of the migrated IAB-node, a TNL address allocated by the target donor-DU, the target donor-CU and the source donor-CU deactivate TNL tunnel transmission of F1-C and non-F1 data of the migrated IAB-node.

In some embodiments, the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, a source TNL address of the uplink non-F1 data needing to deactivate the TNL tunnel transmission, or a GTP TEID of the uplink F1 user plane needing to deactivate the TNL tunnel transmission.

For example, the target donor-CU transmits a TNL tunnel transmission update or release request to the target donor- DU. The TNL tunnel transmission update or release request includes an endpoint TNL address of a TNL tunnel at a source donor-DU side; moreover, the TNL tunnel transmission update or release request may further include a source TNL address of the uplink F1 user plane needing to deactivate the tunnel transmission, a source TNL address of the uplink F1 control plane needing to deactivate the tunnel transmission, a source TNL address of the uplink non-F1 data needing to deactivate the tunnel transmission.

F1 here includes an F1 connection of the migrated IAB-node and its descendant node. It should be noted that because the minimum granularity of uplink F1 user plane path distribution is a UE bearer, and when requesting removal of tunnel transmission of an uplink F1 user plane, UL GTP TEID further needs to be indicated in addition to a source TNL address.

In some embodiments, a second donor distributed unit transmits a TNL tunnel transmission update or release response to a second donor centralized unit, the TNL tunnel transmission update or release response including an endpoint TNL address of a TNL tunnel of the second donor distributed unit.

In some embodiments, the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

For example, the target donor-DU transmits a TNL tunnel transmission update or release response to the target donor-CU. The TNL tunnel transmission update or release response includes an endpoint TNL address of a TNL tunnel at the target donor-DU side; moreover, the TNL tunnel transmission update or release response may further include a source TNL address of an uplink F1 user plane successfully deactivating the tunnel transmission, a source TNL address of an uplink F1 control plane successfully deactivating the tunnel transmission, a source TNL address of uplink non-F1 data successfully deactivating the tunnel transmission, a source TNL address failing in being deactivated.

Figure 17:
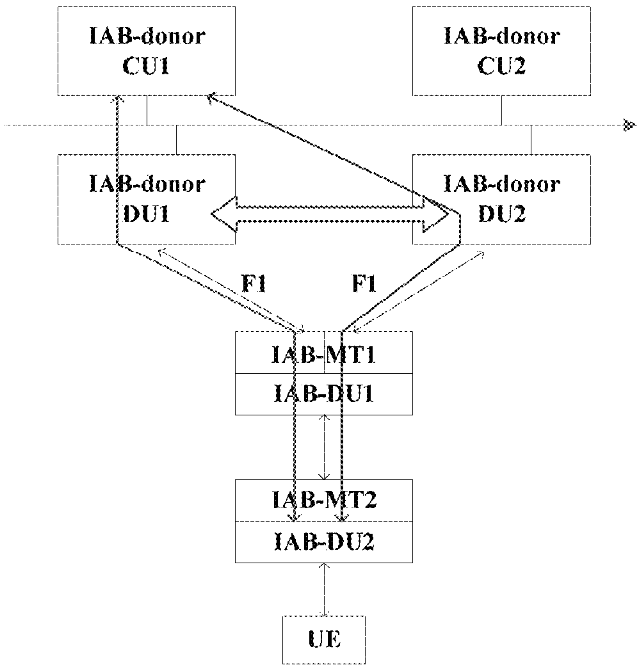
FIG. 17 is another exemplary diagram of deactivating a TNL tunnel in the embodiments of the present disclosure.

FIG. 17 is an exemplary diagram of deactivating a TNL tunnel in the embodiments of the present disclosure. As shown in FIG. 17, after TNL tunnel transmission update or release of the target donor-DU, the target donor-DU does not transmit to the source donor-DU uplink data deactivated the TNL tunnel transmission (the source TNL address is the TNL address allocated by the source Donor-DU) via the TNL tunnel, but directly discards such uplink data.

In some embodiments, a second donor distributed unit further receives a service mapping information release indication transmitted by a donor centralized unit, the service mapping information release indication being used to release configuration of a BAP routing identifier of downlink data deactivated the TNL tunnel transmission and configuration of a backhaul RLC channel between the second donor distributed unit and the next hop of descendant node.

For example, after being configured with a TNL address allocated by the target donor-DU, the IAB-node may further transmit an applied TNL address of uplink data and downlink data to the source donor-CU via an F1 connection control plane signaling (F1AP). For example, an applied TNL address, allocated by the target donor-DU, respectively for an F1 user plane, an F1 control plane and non-F1 data and a TNL address previously used by these data (a TNL address allocated by the source donor-DU) may be transmitted to the source donor-CU. In this way, the source donor-CU and the target donor-DU respectively trigger a request for the source donor-DU and the target donor-DU to remove these data from the TNL tunnel transmission.

In addition, in the target donor-DU, the target donor-CU further reconfigures service mapping information for downlink data that is configured with an TNL address allocated by the target donor-DU, including configuring a BAP target address and a path identifier corresponding to the TNL address of the downlink data and DSCP, and an identifier of a backhaul RLC channel between the target donor-DU and a next hop of IAB-node, to which a new TNL address of the downlink data and the DSCP are mapped. And, the donor-CU further removes service mapping information before such downlink data.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, a second donor distributed unit (a target donor-DU) adds a header related to a TNL tunnel to uplink data, and transmits the uplink data to a first donor distributed unit (an original donor-DU) via the TNL tunnel, thereby establishing a TNL tunnel between the source donor-DU and the target donor-DU of the IAB-node migration, which may solve the problem that uplink data is discarded.

Embodiments of a Second Aspect

The embodiments of the present disclosure provide an IAB communication method, which is illustrated from a side of transmission of downlink data by a first donor distributed unit. An IAB node is migrated from a first donor distributed unit (a source donor-DU) to a second donor distributed unit (a target donor-DU), and a transport network layer (TNL) tunnel is established between the first donor distributed unit and the second donor distributed unit.

Figure 18:
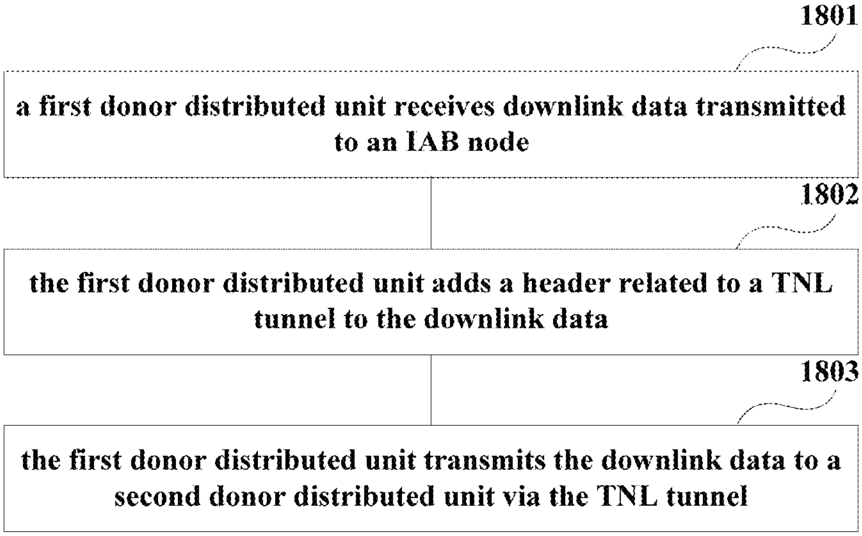
FIG. 18 is a schematic diagram of an IAB communication method in the embodiments of the present disclosure.

FIG. 18 is a schematic diagram of an IAB communication method in the embodiments of the present disclosure. As shown in FIG. 18, the method includes:

1801, a first donor distributed unit receives downlink data transmitted to an IAB node;

1802, the first donor distributed unit adds a header related to a TNL tunnel to the downlink data; and

1803, the first donor distributed unit transmits the downlink data to the second donor distributed unit via the TNL tunnel.

It should be noted that the above FIG. 18 is only schematic description of the embodiments of the present disclosure, but the present disclosure is not limited to this. For example, an execution step of each operation may be adjusted appropriately, moreover other some operations may be increased or reduced. Persons skilled in the art may make appropriate modifications according to the above contents, not limited to the records in the above FIG. 18.

In some embodiments, the header includes at least one of the following: an Internet Protocol (IP) header, a General Packet Radio Service (GPRS) Tunneling Protocol (GTP) header, a User Datagram Protocol (UDP) header or a Transmission Control Protocol (TCP) header.

In some embodiments, a source transport network layer (TNL) address of the header is a transport network layer (TNL) address of the first donor distributed unit or a TNL address that is able to be routed by the first donor distributed unit, and a target transport network layer (TNL) address of the header is a transport network layer (TNL) address of the second donor distributed unit.

For example, downlink data of which the target TNL address being a TNL address that may be routed via the source Donor-DU is added with an IP header by the source donor-DU, or is further added with a GTP/UDP or TCP header. The source TNL address in the added IP header and the GTP/UDP or TCP header are the TNL address of the source donor-DU, the target TNL address is the TNL address of an endpoint of a tunnel at the target donor-DU side (i.e., the TNL address of the target donor-DU).

Hence, a TNL tunnel is established between the source donor-DU and the target donor-DU of the IAB-node migration, so that when the IAB-node performs migration across donor distributed units, downlink data of which the target TNL address being a TNL address that may be routed via the source Donor-DU is transmitted by the source donor-DU to the target donor-DU via the TNL tunnel, and is routed to the IAB-node or its descendant node via a BAP layer, which solves the problem that the downlink may not be routed to the target donor-DU and is discarded by the source donor-DU.

The embodiments of the present disclosure are further described below through transmission of downlink data in different scenarios.

First, downlink data transmission in an intra-donor CU migration scenario (for example, called Scenario 1) is described. For an example of activating and deactivating a TNL tunnel under the Scenario 1, FIG. 10 and FIG. 11 may be referred to.

In some embodiments, a migrated IAB-node switches from a first donor distributed unit to a second donor distributed unit, or RRC is reestablished to the second donor distributed unit after a radio link failure from the migrated IAB-node to the first donor distributed unit; wherein the first donor distributed unit and the second donor distributed unit belong to the same donor centralized unit (donor-CU).

In other words, when the IAB-node performs intra-donor CU migration, TNL tunnel transmission is performed between the source donor-DU and the target donor-DU. For example, when the migrated IAB-node is switched to a new parent node, transmission paths of all data are transferred from the source parent node of the IAB-node to the new parent node, donor-DU is changed from the source donor-DU into the target donor-DU. Regardless of whether the migrated IAB-node and a descendant node are configured with the TNL address allocated by the target donor-DU, discarding downlink data occurs, TNL tunnel transmission between the target donor-DU and the source Donor-DU is required.

In some embodiments, the first donor distributed unit receives a TNL tunnel transmission setup request transmitted by a donor centralized unit, the TNL tunnel transmission setup request including an endpoint TNL address of the TNL tunnel of the second donor distributed unit; the TNL tunnel transmission setup request is used to request the first donor distributed unit to set up a TNL tunnel or activate the TNL tunnel transmission of downlink data.

In some embodiments, when the donor centralized unit receives a switching completion message of the migrated IAB-node, or after the donor centralized unit receives an RRC reestablishment completion message of the IAB-node, or when the donor centralized unit does not configure the TNL address allocated by the second donor distributed unit for the migrated IAB-node or its descendant node, the first donor distributed unit receives a TNL tunnel transmission setup request transmitted by the donor centralized unit.

In some embodiments, the TNL tunnel transmission setup request further includes at least one of the following: a target TNL address of a downlink F1 user plane needing to activate the TNL tunnel transmission, a target TNL address of a downlink F1 control plane needing to activate the TNL tunnel transmission, or a target TNL address of downlink non-F1 data needing to activate the TNL tunnel transmission.

For example, donor-CU transmits a TNL tunnel transmission setup request to the source donor-DU. The TNL tunnel transmission setup request includes an endpoint TNL address of a TNL tunnel at the target donor-DU side. Moreover, the TNL tunnel transmission setup request may further include a target TNL address of a downlink F1 user plane, a target TNL address of a downlink F1 control plane, and a target TNL address of downlink non-F1 data. F1 here includes an F1 connection of the migrated IAB-node and its descendant node.

In some embodiments, a first donor distributed unit transmits a TNL tunnel transmission setup response to a donor centralized unit, the TNL tunnel transmission setup response including an endpoint TNL address of a TNL tunnel of the first donor distributed unit.

In some embodiments, the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

For example, the source donor-DU transmits the TNL tunnel transmission setup response to the donor-CU. The TNL tunnel transmission setup response includes an endpoint TNL address of a TNL tunnel at the source donor-DU side; moreover, the TNL tunnel transmission setup response may further include a target TNL address of a downlink F1 user plane successfully activating the tunnel transmission, a target TNL address of a downlink F1 control plane successfully activating the tunnel transmission, a target TNL address of downlink non-F1 data successfully activating the tunnel transmission, a target TNL address failing in being activated.

Hence, after TNL tunnel transmission of the source donor-DU is established, the source donor-DU transmits downlink data configured in the TNL tunnel transmission setup request (the target TNL address is the TNL address allocated by the source Donor-DU) to the target donor-DU via the TNL tunnel, and then the downlink data may be transmitted to the migrated IAB-node or its descendant node after being added with a BAP routing identifier by a BAP layer of the target donor-DU.

In some embodiments, a first donor distributed unit receives a TNL tunnel transmission update or release request transmitted by a donor centralized unit, the TNL tunnel transmission update or release request including an endpoint TNL address of a TNL tunnel of a second donor distributed unit, wherein the TNL tunnel transmission update or release request is used to request the first donor distributed unit to deactivate TNL tunnel transmission of the downlink data or release the TNL tunnel.

For example, after the donor-CU configures to the IAB-node the TNL address allocated by the target donor-DU (i.e., the TNL address that may be routed by the target donor-DU), uplink data and downlink data carrying the TNL address allocated by the target donor-DU may be successfully transmitted to the donor-CU or IAB-node without needing TNL transmission, the donor-CU may trigger an update or release the TNL tunnel transmission for the relevant uplink data and downlink data.

In some embodiments, after the donor centralized unit configures for an migrated IAB-node or its descendant node a TNL address allocated by the second donor distributed unit, or after the migrated IAB-node completes a preset time of switching, or after the migrated IAB-node completes a preset time of reestablishment, the first donor distributed unit receives the TNL tunnel transmission update or release request transmitted by the donor centralized unit.

For example, if during a switching process of the migrated IAB-node, the donor-CU configures for the migrated IAB-node a TNL address for F1-C and non-F1 data that may be routed via the target donor-DU, after completing a preset time of switching, the donor-CU deactivates TNL tunnel transmission for F1-C and non-F1 data of the migrated IAB-node.

For another example, after completing switching, the donor-CU configures for the migrated IAB-node a TNL address for F1-U data that may be routed via the target donor-DU through an RRC reconfiguration message, after a preset time of completing the RRC reconfiguration, the donor-CU deactivates TNL tunnel transmission for F1-U of the migrated IAB-node.

In order to successfully route uplink data and downlink inflight data to the donor-CU or the IAB-node respectively via the TNL tunnel, after the donor-CU configures for the IAB-node a preset time of a TNL address allocated by the target donor-DU, the TNL tunnel transmission update or release is then triggered.

In some embodiments, the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, or a target TNL address of the downlink non-F1 data needing to deactivate the TNL tunnel transmission.

For example, the donor-CU transmits a TNL tunnel transmission update or release request to the source donor-DU. The TNL tunnel transmission update or release request includes an endpoint TNL address of a TNL tunnel at a target donor-DU side; moreover, the TNL tunnel transmission update or release request may further include a target TNL address of the downlink F1 user plane needing to deactivate the tunnel transmission, a target TNL address of the downlink F1 control plane needing to deactivate the tunnel transmission, a target TNL address of the downlink non-F1 data needing to deactivate the tunnel transmission. F1 here includes an F1 connection of the migrated IAB-node and its descendant node.

In some embodiments, a first donor distributed unit transmits a TNL tunnel transmission update or release response to a donor centralized unit, the TNL tunnel transmission update or release response including an endpoint TNL address of a TNL tunnel of the first donor distributed unit.

In some embodiments, the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

For example, the source donor-DU transmits a TNL tunnel transmission update or release response to the donor-CU. The TNL tunnel transmission update or release response includes an endpoint TNL address of a TNL tunnel at the source donor-DU side; moreover, the TNL tunnel transmission update or release response may further include a target TNL address of a downlink F1 user plane successfully deactivating the tunnel transmission, a target TNL address of a downlink F1 control plane successfully deactivating the tunnel transmission, a target TNL address of downlink non-F1 data successfully deactivating the tunnel transmission, a target TNL address failing in being deactivated.

Hence, after TNL tunnel transmission update or release of the source donor-DU, the source donor-DU does not transmit downlink data deactivated the TNL tunnel transmission (the target TNL address is the TNL address allocated by the source Donor-DU) to the target donor-DU via the TNL tunnel, but directly discards such downlink data.

Downlink data transmission in an intra-donor CU dual connection scenario (for example, called Scenario 2) is then described. For an example of activating and deactivating a TNL tunnel under the Scenario 2, FIG. 12 and FIG. 13 may be referred to.

In some embodiments, the IAB node performs multi-path distribution in the donor centralized unit (intra-donor CU), and the first donor distributed unit and the second donor distributed unit belong to the same donor centralized unit (donor-CU).

In other words, when the IAB-node performs intra-donor CU multi-path distribution (intra-donor CU topology redundancy), TNL tunnel transmission is performed between the source donor-DU and the target donor-DU. For example, when an migrated IAB-node is accessed to a new parent node, a transmission path of one part of data is transferred from the source parent node of the IAB-node to the new parent node, the donor-DU is changed from the source donor-DU into the target donor-DU, while a transmission path of the other part of data is still transmitted via the source parent node and the source donor-DU. For data whose transmission path is migrated to the target donor-DU, if a TNL address allocated by the target donor-DU is not configured, downlink data is discarded, and TNL tunnel transmission between the target donor-DU and the source Donor-DU is required.

In some embodiments, the first donor distributed unit receives a TNL tunnel transmission setup request transmitted by a donor centralized unit, the TNL tunnel transmission setup request including an endpoint TNL address of the TNL tunnel of the second donor distributed unit; the TNL tunnel transmission setup request is used to request the first donor distributed unit to set up the TNL tunnel or activate the TNL tunnel transmission of downlink data.

In some embodiments, in a case where a donor centralized unit configures a backhaul adaptive protocol (BAP) routing of an IAB-node as a BAP routing identifier of the second donor distributed unit but does not configure a TNL address allocated by the second donor distributed unit, the first donor distributed unit receives the TNL tunnel transmission setup request transmitted by the donor centralized unit.

For example, when a transmission path of the IAB-node data is transferred to a new parent node and the target donor-DU, for example when the donor-CU configures for the IAB-node a BAP address that may be routed via the target donor-DU, and routes a downlink F1 control plane and non-F1 data of the IAB-node from the target donor-DU to the IAB-node, but does not configure for the IAB-node a TNL address allocated by the target donor-DU, the donor-CU triggers to set up TNL tunnel transmission.

In some embodiments, the TNL tunnel transmission setup request further includes at least one of the following: a target TNL address of the downlink F1 user plane needing to activate TNL tunnel transmission, a target TNL address of the downlink F1 control plane needing to activate the TNL tunnel transmission, a target TNL address of the downlink non-F1 data needing to activate the TNL tunnel transmission, or a GTP TEID of the downlink F1 user plane needing to activate the TNL tunnel transmission.

For example, donor-CU transmits a TNL tunnel transmission setup request to the source donor-DU. The TNL tunnel transmission setup request includes an endpoint TNL address of a TNL tunnel at a target donor-DU side; moreover, the TNL tunnel transmission setup request may further include a target TNL address of the downlink F1 user plane needing tunnel transmission, a target TNL address of the downlink F1 control plane needing the tunnel transmission, a target TNL address of the downlink non-F1 data needing the tunnel transmission.

F1 here includes an F1 connection of the migrated IAB-node and its descendant node. It should be noted that because the minimum granularity of downlink F1 user plane path distribution is a UE bearer, and when requesting tunnel transmission of a downlink F1 user plane, DL GTP TEID further needs to be indicated in addition to a target TNL address.

In some embodiments, a first donor distributed unit transmits a TNL tunnel transmission setup response to a donor centralized unit, the TNL tunnel transmission setup response including an endpoint TNL address of a TNL tunnel of the first donor distributed unit.

In some embodiments, the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

For example, the source donor-DU transmits the TNL tunnel transmission setup response to the donor-CU. The TNL tunnel transmission setup response includes an endpoint TNL address of a TNL tunnel at the source donor-DU side; moreover, the TNL tunnel transmission setup response may further include a target TNL address of a downlink F1 user plane successfully activating the tunnel transmission, a target TNL address of a downlink F1 control plane successfully activating the tunnel transmission, a target TNL address of downlink non-F1 data successfully activating the tunnel transmission, a target TNL address failing in being activated.

Hence, after TNL tunnel transmission of the source donor-DU is established, the source donor-DU transmits downlink data configured in the TNL tunnel transmission setup request (the target TNL address is the TNL address allocated by the source Donor-DU) to the target donor-DU via the TNL tunnel, and then the downlink data may be transmitted to the migrated IAB-node or its descendant node after being added with a BAP target address and a path identifier by a BAP layer of the target donor-DU.

In some embodiments, a first donor distributed unit receives a TNL tunnel transmission update or release request transmitted by a donor centralized unit, the TNL tunnel transmission update or release request including an endpoint TNL address of a TNL tunnel of a second donor distributed unit; wherein the TNL tunnel transmission update or release request is used to request the first donor distributed unit to deactivate TNL tunnel transmission of the downlink data or release the TNL tunnel.

In some embodiments, after the donor centralized unit configures for the IAB-node a TNL address allocated by the second donor distributed unit, the first donor distributed unit receives a TNL tunnel transmission update or release request transmitted by the donor centralized unit.

For example, after a TNL address allocated by the target donor-DU (i.e., a TNL address that may be routed via the target donor-DU) is configured for data migrated from the IAB-node to the target donor-CU side, downlink data carrying the TNL address allocated by the target donor-DU may be successfully transmitted to the IAB-node without needing TNL tunnel transmission, the donor-CU may trigger an update or release the TNL tunnel transmission for the relevant downlink data.

For example, if a migrated IAB-node is connected to a new parent node, after establishing a dual connection with the new parent node, its F1 control plane data and non-F1 data are migrated to the target donor-DU, and when the donor-CU configures, for the F1 control plane and the non-F1 data of the migrated IAB-node, a TNL address allocated by the target donor-DU, the donor-CU deactivates TNL tunnel transmission of F1-C and non-F1 data of the migrated IAB-node.

In some embodiments, the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, a target TNL address of the downlink non-F1 data needing to deactivate the TNL tunnel transmission, or a GTP TEID of the downlink F1 user plane needing to deactivate the TNL tunnel transmission.

For example, the donor-CU transmits a TNL tunnel transmission update or release request to the source donor-DU. The TNL tunnel transmission update or release request includes an endpoint TNL address of a TNL tunnel at a target donor-DU side; moreover, the TNL tunnel transmission update or release request may further include a target TNL address of the downlink F1 user plane without needing the tunnel transmission, a target TNL address of the downlink F1 control plane without needing the tunnel transmission, a target TNL address of the downlink non-F1 data without needing the tunnel transmission.

F1 here includes an F1 connection of the migrated IAB-node and its descendant node. It should be noted that because the minimum granularity of downlink F1 user plane path distribution is a UE bearer, and when requesting removal of tunnel transmission of a downlink F1 user plane, DL GTP TEID further needs to be indicated in addition to a target TNL address.

In some embodiments, a first donor distributed unit transmits a TNL tunnel transmission update or release response to a donor centralized unit, the TNL tunnel transmission update or release response including an endpoint TNL address of a TNL tunnel of the first donor distributed unit.

In some embodiments, the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

For example, the source donor-DU transmits the TNL tunnel transmission setup response to the donor-CU. The TNL tunnel transmission setup response includes an endpoint TNL address of a TNL tunnel at the source donor-DU side; moreover, the TNL tunnel transmission setup response may further include a target TNL address of a downlink F1 user plane successfully activating the tunnel transmission, a target TNL address of a downlink F1 control plane successfully activating the tunnel transmission, a target TNL address of downlink non-F1 data successfully activating the tunnel transmission, a target TNL address failing in being activated.

Hence, after TNL tunnel transmission update or release of the source donor-DU, the source donor-DU does not transmit downlink data deactivated the TNL tunnel transmission (the target TNL address is the TNL address allocated by the source Donor-DU) to the target donor-DU via the TNL tunnel, but directly discards such downlink data.

Downlink data transmission in an inter-donor CU migration scenario (for example, called Scenario 3) is then described. For an example of activating and deactivating a TNL tunnel under the Scenario 3, FIG. 14 and FIG. 15 may be referred to.

In some embodiments, an IAB node switches from a first donor distributed unit to a second donor distributed unit, or RRC is reestablished to the second donor distributed unit after a radio link failure (RLF) from the IAB node to the first donor distributed unit, the first donor distributed unit belonging to a first donor centralized unit, and the second donor distributed unit belonging to a second donor centralized unit.

In other words, when the IAB-node performs inter-donor-CU migration, TNL tunnel transmission is performed between the source donor-DU and the target donor-DU. The source donor-DU is controlled by the source donor-CU, the target donor-DU is controlled by the target donor-CU.

For example, when the migrated IAB-node is switched to a node controlled by the target donor-CU, transmission paths of all data are transferred from the source donor-CU side of the IAB-node to the target donor-CU side, the donor-DU is changed from the source donor-DU into the target donor-DU. Regardless of whether the migrated IAB-node and a descendant node are configured with the TNL address allocated by the target donor-DU, discarding downlink data occurs, TNL tunnel transmission between the target donor-DU and the source Donor-DU is required.

In some embodiments, the first donor distributed unit receives a TNL tunnel transmission setup request transmitted by a first donor centralized unit, the TNL tunnel transmission setup request including an endpoint TNL address of the TNL tunnel of the second donor distributed unit; the TNL tunnel transmission setup request is used to request the first donor distributed unit to set up the TNL tunnel or activate the TNL tunnel transmission of downlink data.

In some embodiments, after the second donor centralized unit receives a switching completion message of the IAB-node, or after the second donor centralized unit receives an RRC reestablishment completion message of the IAB-node, or when the second donor centralized unit does not configure the TNL address allocated by the second donor distributed unit for the IAB-node, the first donor distributed unit receives a TNL tunnel transmission setup request transmitted by the first donor centralized unit.

For example, a Handover Request message transmitted by the source donor-CU to the target donor-CU for an migrated IAB-node includes an endpoint TNL address of a TNL tunnel of the source donor-DU side, a TNL address allocated by the source donor-DU and used by an F1 user plane, an F1 control plane and non-F1 data of the migrated IAB-node, or further includes a TNL address allocated by the source donor-DU and used by an F1 user plane, an F1 control plane and non-F1 data of a descendant node of the migrated IAB-node. A Handover Response message transmitted by the target donor-CU to the source donor-CU for a migrated IAB-node includes an endpoint TNL address of a TNL tunnel of the target donor-DU side.

In some embodiments, the TNL tunnel transmission setup request further includes at least one of the following: a target TNL address of a downlink F1 user plane needing to activate the TNL tunnel transmission, a target TNL address of a downlink F1 control plane needing to activate the TNL tunnel transmission, or a target TNL address of downlink non-F1 data needing to activate the TNL tunnel transmission.

For example, when the source donor-CU receives an IAB-node context release indication transmitted by the target donor-CU, a TNL tunnel transmission setup request is transmitted to the source donor-DU. The TNL tunnel transmission setup request includes an endpoint TNL address of a TNL tunnel at a target donor-DU side; moreover, the TNL tunnel transmission setup request may further include a target TNL address of a downlink F1 user plane, a target TNL address of a downlink F1 control plane, and a target TNL address of downlink non-F1 data. F1 here includes an F1 connection of the migrated IAB-node and its descendant node.

In some embodiments, a first donor distributed unit transmits a TNL tunnel transmission setup response to a first donor centralized unit, the TNL tunnel transmission setup response including an endpoint TNL address of a TNL tunnel of the first donor distributed unit.

In some embodiments, the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

For example, the source donor-DU transmits the TNL tunnel transmission setup response to the source donor-CU. The TNL tunnel transmission setup response includes an endpoint TNL address of a TNL tunnel at the source donor-DU side; moreover, the TNL tunnel transmission setup response may further include a target TNL address of a downlink F1 user plane successfully activating the tunnel transmission, a target TNL address of a downlink F1 control plane successfully activating the tunnel transmission, a target TNL address of downlink non-F1 data successfully activating the tunnel transmission, a target TNL address failing in being activated.

Hence, after TNL tunnel transmission of the source donor-DU is established, the source donor-DU transmits downlink data activating the TNL tunnel transmission (the target TNL address is the TNL address allocated by the source Donor-DU) to the target donor-DU via the TNL tunnel, and then the downlink data may be transmitted to the migrated IAB-node or its descendant node after being added with a routing identifier by a BAP layer of the target donor-DU.

In some embodiments, a first donor distributed unit receives a TNL tunnel transmission update or release request transmitted by a first donor centralized unit, the TNL tunnel transmission update or release request including an endpoint TNL address of a TNL tunnel of a second donor distributed unit, wherein the TNL tunnel transmission update or release request is used to request the first donor distributed unit to deactivate TNL tunnel transmission of the downlink data or release the TNL tunnel.

For example, after the target donor-CU configures a TNL address allocated by the target donor-DU (i.e., a TNL address that may be routed by the target donor-DU) for the IAB-node, uplink data and downlink data carrying the TNL address allocated by the target donor-DU may be successfully transmitted to the source donor-CU or IAB-node without needing TNL tunnel transmission, the target donor-CU may trigger an update or release the TNL tunnel transmission for the relevant uplink data, and the source donor-CU may trigger an update or release the TNL tunnel transmission for the downlink data.

In some embodiments, after the second donor centralized unit configures for the IAB-node a TNL address allocated by the second donor distributed unit, or after the IAB-node completes a preset time of switching, or after the IAB-node completes a preset time of reestablishment, the first donor distributed unit receives the TNL tunnel transmission update or release request transmitted by the first donor centralized unit.

For example, if during a switching process of the migrated IAB-node, the target donor-CU configures for the migrated IAB-node a TNL address for F1-C and non-F1 data that may be routed via the target donor-DU, after completing a preset time of switching, the target donor-CU and the source donor-CU deactivate TNL tunnel transmission for F1-C and non-F1 data of the migrated IAB-node.

For another example, after completing switching, the target donor-CU configures for the migrated IAB-node a TNL address for F1-U data that may be routed via the target donor-DU through an RRC reconfiguration message, after a preset time of completing the RRC reconfiguration, the target donor-CU and the source donor-CU deactivate TNL tunnel transmission for F1-U of the migrated IAB-node.

In order to successfully route downlink inflight data to the IAB-node via the TNL tunnel, after the target donor-CU configures for the IAB-node a preset time of a TNL address allocated by the target donor-DU, the TNL tunnel transmission update or release is then triggered.

In some embodiments, the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, or a target TNL address of the downlink non-F1 data needing to deactivate the TNL tunnel transmission.

For example, the target donor-CU transmits to the source donor-CU a TNL address allocated by the target donor-DU for an F1 user plane or an F1 control plane and non-F1 data of the migrated IAB-node, or a TNL address allocated by the target donor-DU for an F1 user plane or an F1 control plane and non-F1 data of a descendant node of the migrated IAB-node, such as via a Handover Response message for the migrated IAB-node.

For example, the source donor-CU transmits a TNL tunnel transmission update or release request to the source donor-DU. The TNL tunnel transmission update or release request includes an endpoint TNL address of a TNL tunnel at a target donor-DU side; moreover, the TNL tunnel transmission update or release request may further include a target TNL address of the downlink F1 user plane without needing the tunnel transmission, a target TNL address of the downlink F1 control plane without needing the tunnel transmission, a target TNL address of the downlink non-F1 data without needing the tunnel transmission. F1 here includes an F1 connection of the migrated IAB-node and its descendant node.

In some embodiments, a first donor distributed unit transmits a TNL tunnel transmission update or release response to a first donor centralized unit, the TNL tunnel transmission update or release response including an endpoint TNL address of a TNL tunnel of the first donor distributed unit.

In some embodiments, the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

For example, the target donor-DU transmits a TNL tunnel transmission update or release response to the target donor-CU. The TNL tunnel transmission update or release response includes an endpoint TNL address of a TNL tunnel at the source donor-DU side; moreover, the TNL tunnel transmission update or release response may further include a target TNL address of a downlink F1 user plane successfully deactivating the tunnel transmission, a target TNL address of a downlink F1 control plane successfully deactivating the tunnel transmission, a target TNL address of downlink non-F1 data successfully deactivating the tunnel transmission, a target TNL address failing in being deactivated.

Hence, after TNL tunnel transmission update or release of the source donor-DU, the source donor-DU does not transmit downlink data deactivated the TNL tunnel transmission (the target TNL address is the TNL address allocated by the source Donor-DU) to the target donor-DU via the TNL tunnel, but directly discards such downlink data.

Downlink data transmission in an inter-donor CU dual connection scenario (for example, called Scenario 4) is then described. For an example of activating and deactivating a TNL tunnel under the Scenario 4, FIG. 16 and FIG. 17 may be referred to.

In some embodiments, the IAB node performs multi-path distribution across the donor centralized units (inter-donor CU), the first donor distributed unit belongs to a first donor centralized unit, and the second donor distributed unit belongs to a second donor centralized unit.

In other words, when a migrated IAB-node performs inter-donor CU multi-path distribution (inter-donor-CU topology redundancy), TNL tunnel transmission is performed between the source donor-DU and the target donor-DU. The source donor-DU is controlled by the source donor-CU, the target donor-DU is controlled by the target donor-CU.

For example, when the migrated IAB-node is accessed to a node controlled by the target donor-CU, a transmission path of one part of data is transferred from the source donor-CU side of the IAB-node to the target donor-CU side, the donor-DU is changed from the source donor-DU into the target donor-DU; while a transmission path of the other part of data is still transmitted via the source parent node and the source donor-DU. For data whose transmission path is migrated to the target donor-DU, if a TNL address allocated by the target donor-DU is not configured, downlink data is discarded, and TNL tunnel transmission between the target donor-DU and the source Donor-DU is required.

In some embodiments, the first donor distributed unit receives a TNL tunnel transmission setup request transmitted by a first donor centralized unit, the TNL tunnel transmission setup request including an endpoint TNL address of the TNL tunnel of the second donor distributed unit; the TNL tunnel transmission setup request is used to request the first donor distributed unit to set up the TNL tunnel or activate the TNL tunnel transmission of downlink data.

In some embodiments, in a case where the second donor centralized unit configures a backhaul adaptive protocol (BAP) routing of an IAB-node as a BAP routing identifier of the second donor distributed unit but does not configure for the IAB-node a TNL address allocated by the second donor distributed unit, the first donor distributed unit receives the TNL tunnel transmission setup request transmitted by the first donor centralized unit.

For example, the source donor-CU transmits to the target donor-CU an endpoint TNL address of a TNL tunnel of the source donor-DU side, a downlink F1 user plane, an F1 control plane or non-F1 data of the migrated IAB-node or a descendant node which requests migration to the target donor-CU side, and a TNL address allocated by the source donor-DU to these data, for example, via a SgNB node addition request message or a SgNB node modification request for the migrated IAB-node. The target donor-CU transmits to the source donor-CU an endpoint TNL address of a TNL tunnel of the target donor-DU side, for example via a SgNB node addition response message or a SgNB node modification response message for the migrated IAB-node.

For example, when a transmission path of the IAB-node data is transferred to the target donor-CU side, i.e., when the target donor-CU configures for the IAB-node a BAP address that may be routed by the target donor-DU and routes a downlink F1 control plane and non-F1 data of the IAB-node to the IAB-node from the target donor-DU, but does not configure for the IAB-node a TNL address allocated by the target donor-DU, the target donor-CU and the source donor-CU trigger to set up TNL tunnel transmission.

In some embodiments, the TNL tunnel transmission setup request further includes at least one of the following: a target TNL address of the downlink F1 user plane needing to activate TNL tunnel transmission, a target TNL address of the downlink F1 control plane needing to activate the TNL tunnel transmission, a target TNL address of the downlink non-F1 data needing to activate the TNL tunnel transmission, or a GTP TEID of the downlink F1 user plane needing to activate the TNL tunnel transmission.

For example, the target donor-CU transmits to the source donor-CU an uplink F1 user plane, an F1 control plane or non-F1 data of the migrated IAB-node or a descendant node which are successfully migrated to the target donor-CU side, a downlink F1 user plane, an F1 control plane or non-F1 data of the migrated IAB-node or a descendant node, or a TNL address allocated by the target donor-DU to these data, such as via a SgNB node addition response message or a SgNB node modification response message for the migrated IAB-node. If the SgNB node addition response message or the SgNB node modification response message does not include the TNL address allocated by the target donor-DU to these data, the source donor-CU transmits a TNL tunnel transmission setup request to the source donor-DU.

For example, the TNL tunnel transmission setup request includes an endpoint TNL address of a TNL tunnel at a target donor-DU side; moreover, the TNL tunnel transmission setup request may further include a target TNL address of a downlink F1 user plane, a target TNL address of a downlink F1 control plane, and a target TNL address of downlink non-F1 data.

F1 here includes an F1 connection of the migrated IAB-node and its descendant node. It should be noted that because the minimum granularity of downlink F1 user plane path distribution is a UE bearer, and when requesting tunnel transmission of a downlink F1 user plane, DL GTP TEID further needs to be indicated in addition to a target TNL address.

In some embodiments, a first donor distributed unit transmits a TNL tunnel transmission setup response to a first donor centralized unit, the TNL tunnel transmission setup response including an endpoint TNL address of a TNL tunnel of the first donor distributed unit.

In some embodiments, the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

For example, the source donor-DU transmits the TNL tunnel transmission setup response to the source donor-CU. The TNL tunnel transmission setup response includes an endpoint TNL address of a TNL tunnel at the source donor-DU side; moreover, the TNL tunnel transmission setup response may further include a target TNL address of a downlink F1 user plane successfully activating the tunnel transmission, a target TNL address of a downlink F1 control plane successfully activating the tunnel transmission, a target TNL address of downlink non-F1 data successfully activating the tunnel transmission, a target TNL address failing in being activated.

Hence, after TNL tunnel transmission of the source donor-DU is established, the source donor-DU transmits downlink data activating the TNL tunnel transmission (the target TNL address is the TNL address allocated by the source Donor-DU) to the target donor-DU via the TNL tunnel, and then the downlink data may be transmitted to the migrated IAB-node or its descendant node after being added with a BAP routing identifier by a BAP layer of the target donor-DU.

In some embodiments, a first donor distributed unit receives a TNL tunnel transmission update or release request transmitted by a first donor centralized unit, the TNL tunnel transmission update or release request including an endpoint TNL address of a TNL tunnel of a second donor distributed unit, wherein the TNL tunnel transmission update or release request is used to request the first donor distributed unit to deactivate TNL tunnel transmission of the downlink data or release the TNL tunnel.

In some embodiments, after the second donor centralized unit configures for the IAB-node a TNL address allocated by the second donor distributed unit, the first donor distributed unit receives a TNL tunnel transmission update or release request transmitted by the first donor centralized unit.

For example, after the target donor-CU configures to the IAB-node the TNL address allocated by the target donor-DU (i.e., the TNL address that may be routed by the target donor-DU), downlink data carrying the TNL address allocated by the target donor-DU may be successfully transmitted to the source donor-CU or IAB-node without needing TNL tunnel transmission, the source donor-CU may trigger an update or release the TNL tunnel transmission for the relevant downlink data.

For example, if a migrated IAB-node is connected to a new parent node, after establishing a dual connection with the new parent node, its F1 control plane data and non-F1 data are migrated to the target donor-DU, and when the target donor-CU configures, for the F1 control plane and the non-F1 data of the migrated IAB-node, a TNL address allocated by the target donor-DU, the target donor-CU and the source donor-CU deactivate TNL tunnel transmission of F1-C and non-F1 data of the migrated IAB-node.

In some embodiments, the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, a target TNL address of the downlink non-F1 data needing to deactivate the TNL tunnel transmission, or a GTP TEID of the downlink F1 user plane needing to deactivate the TNL tunnel transmission.

For example, the target donor-CU transmits to the source donor-CU a TNL address allocated by the target donor-DU for an F1 user plane or an F1 control plane and non-F1 data of the migrated IAB-node that is migrated to the target donor-CU side, or a TNL address allocated by the target donor-DU for an F1 user plane or an F1 control plane and non-F1 data of a descendant node of the migrated IAB-node that is migrated to the target donor-CU side.

The source donor-CU transmits a TNL tunnel transmission update or release request to the source donor-DU. The TNL tunnel transmission update or release request includes an endpoint TNL address of a TNL tunnel at a target donor-DU side; moreover, the TNL tunnel transmission update or release request may further include a target TNL address of the downlink F1 user plane without needing the tunnel transmission, a target TNL address of the downlink F1 control plane without needing the tunnel transmission, a target TNL address of the downlink non-F1 data without needing the tunnel transmission.

F1 here includes an F1 connection of the migrated IAB-node and its descendant node. It should be noted that because the minimum granularity of downlink F1 user plane path distribution is a UE bearer, and when requesting removal of tunnel transmission of a downlink F1 user plane, DL GTP TEID further needs to be indicated in addition to a target TNL address.

In some embodiments, a first donor distributed unit transmits a TNL tunnel transmission update or release response to a first donor centralized unit, the TNL tunnel transmission update or release response including an endpoint TNL address of a TNL tunnel of the first donor distributed unit.

In some embodiments, the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

For example, the source donor-DU transmits a TNL tunnel transmission update or release response to the source donor-CU. The TNL tunnel transmission update or release response includes an endpoint TNL address of a TNL tunnel at the source donor-DU side; moreover, the TNL tunnel transmission update or release response may further include a target TNL address of a downlink F1 user plane successfully deactivating the tunnel transmission, a target TNL address of a downlink F1 control plane successfully deactivating the tunnel transmission, a target TNL address of downlink non-F1 data successfully deactivating the tunnel transmission, a target TNL address failing in being deactivated.

Hence, after TNL tunnel transmission update or release of the source donor-DU, the source donor-DU does not transmit downlink data deactivated the TNL tunnel transmission (the target TNL address is the TNL address allocated by the source Donor-DU) to the target donor-DU via the TNL tunnel, but directly discards such downlink data.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, a first donor distributed unit (a source donor-DU) adds a header related to a TNL tunnel to downlink data, and transmits the downlink data to a second donor distributed unit (a target donor-DU) via the TNL tunnel, thereby establishing a TNL tunnel between the source donor-DU and the target donor-DU of the IAB-node migration, which may solve the problem that downlink data is discarded.

Embodiments of a Third Aspect

The embodiments of the present disclosure provide an IAB communication method, which is described from a donor centralized unit (donor-CU), the contents same as the embodiments of the first and second aspects are not repeated.

In some embodiments, an IAB-node is migrated from a first donor distributed unit to a second donor distributed unit; the first donor distributed unit and the second donor distributed unit belong to the same donor centralized unit. The IAB-node performs intra-donor CU migration (Scenario 1) or intra-donor CU dual connection (Scenario 2).

In some embodiments, a donor centralized unit indicates a second donor distributed unit to receive uplink data transmitted by an IAB-node, and to transmit the uplink data to a first donor distributed unit via a transport network layer (TNL) tunnel between the second donor distributed unit and the first donor distributed unit.

In some embodiments, a donor centralized unit indicates a first donor distributed unit to receive downlink data transmitted to an IAB-node, and to transmit the downlink data to a second donor distributed unit via a transport network layer (TNL) tunnel between the first donor distributed unit and the second donor distributed unit.

The IAB-node here includes a migrated IAB-node or its descendant node.

In some embodiments, an IAB-node is migrated from a first donor distributed unit to a second donor distributed unit; the first donor distributed unit belonging to a first donor centralized unit, and the second donor distributed unit belonging to a second donor centralized unit. The IAB-node performs inter-donor CU migration (Scenario 3) or inter-donor CU dual connection (Scenario 4).

In some embodiments, a second donor centralized unit indicates a second donor distributed unit to receive uplink data transmitted by an IAB-node, and to transmit the uplink data to a first donor distributed unit via a transport network layer (TNL) tunnel between the second donor distributed unit and the first donor distributed unit.

For example, the second donor centralized unit transmits a TNL tunnel transmission setup request to the second donor distributed unit, the TNL tunnel transmission setup request including an endpoint TNL address of the TNL tunnel of the first donor distributed unit, wherein the TNL tunnel transmission setup request is used to request the second donor distributed unit to set up a TNL tunnel or activate the TNL tunnel transmission of uplink data.

For example, the endpoint TNL address of the TNL tunnel of the first donor distributed unit is transmitted by the first donor centralized unit to the second donor centralized unit.

For another example, when at least one of the following occurs, the second donor centralized unit transmits a TNL tunnel transmission setup request to the second donor distributed unit:

after the second donor centralized unit receives a switching completion message of a migrated IAB-node, after the second donor centralized unit receives an RRC reestablishment completion message of a migrated IAB-node, when the second donor centralized unit does not configure a TNL address allocated by the second donor distributed unit for the migrated IAB-node or its descendant node.

For another example, the second donor centralized unit further receives a TNL address allocated by the first donor distributed unit for the IAB-node and transmitted by the first donor centralized unit, so that the second donor centralized unit transmits a TNL tunnel transmission setup request to the second donor distributed unit.

In some embodiments, a first donor centralized unit indicates a first donor distributed unit to receive downlink data transmitted to an IAB-node, and to transmit the downlink data to a second donor distributed unit via a transport network layer (TNL) tunnel between the first donor distributed unit and the second donor distributed unit.

For example, the first donor centralized unit further transmits a TNL tunnel transmission update or release request to the first donor distributed unit, the TNL tunnel transmission update or release request including an endpoint TNL address of a TNL tunnel of a second donor distributed unit, wherein the TNL tunnel transmission update or release request is used to request the first donor distributed unit to deactivate TNL tunnel transmission of the downlink data or release the TNL tunnel. The IAB-node here includes a migrated IAB-node or its descendant node.

For example, the endpoint TNL address of the TNL tunnel of the second donor distributed unit is transmitted by the second donor centralized unit to the first donor centralized unit.

For example, after the second donor centralized unit configures for the IAB-node a TNL address allocated by the second donor distributed unit, the first donor centralized unit transmits a TNL tunnel transmission update or release request to the first donor distributed unit.

For another example, the second donor centralized unit further transmits a TNL address allocated by the second donor distributed unit for the IAB-node to the first donor centralized unit, so as to trigger the first donor centralized unit to transmit a TNL tunnel transmission update or release request to the first donor distributed unit.

Each of the above embodiments is only illustrative for the embodiments of the present disclosure, but the present disclosure is not limited to this, appropriate modifications can be also made based on the above each embodiment. For example, each of the above embodiments may be used individually, or one or more of the above embodiments may be combined.

As can be known from the above embodiments, through an indication from the donor-CU and/or interaction between the target donor-CU and the source donor-CU, establishing a TNL tunnel between the source donor-DU and the target donor-DU of the IAB-node migration may solve the problem that uplink data and downlink data are discarded.

Embodiments of a Fourth Aspect

The embodiments of the present disclosure provide an IAB communication device, the device may, for example, be an IAB-donor equipment in an IAB system, or may also be a component or components or an assembly or a module configured in the IAB-donor equipment. The IAB system includes the IAB-donor equipment and an IAB-node; the IAB-donor equipment may further include an IAB-donor-CU and an IAB-donor-DU.

Figure 19:
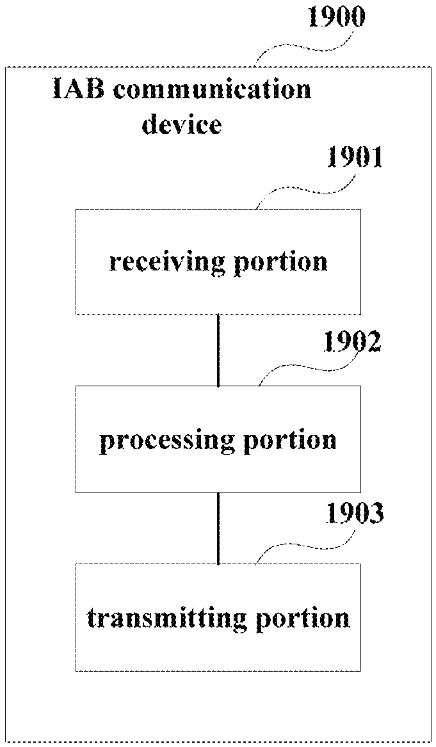
FIG. 19 is a schematic diagram of an IAB communication device in the embodiments of the present disclosure.

FIG. 19 is a schematic diagram of an IAB communication device in the embodiments of the present disclosure. As shown in FIG. 19, an IAB communication device 1900 includes: a receiving portion 1901, a processing portion 1902 and a transmitting portion 1903.

In some embodiments, the receiving portion 1901 receives uplink data transmitted by an IAB node; the processing portion 1902 adds a header related to a transport network layer tunnel to the uplink data; and the transmitting portion 1903 transmits the uplink data to a first donor distributed unit via the transport network layer tunnel.

In some embodiments, the header includes at least one of the following: an Internet Protocol header, a General Packet Radio Service Tunneling Protocol header, a User Datagram Protocol header or a Transmission Control Protocol header.

In some embodiments, a source transport network layer address of the header is a TNL address of the second donor distributed unit or a TNL address that is able to be routed by the second donor distributed unit, and a target TNL address of the header is a TNL address of the first donor distributed unit.

In some embodiments, an IAB node switches from a first donor distributed unit to a second donor distributed unit, or radio resource control is reestablished to the second donor distributed unit after a radio link failure from the IAB node to the first donor distributed unit, wherein the first donor distributed unit and the second donor distributed unit belong to the same donor centralized unit.

In some embodiments, the receiving portion 1901 further receives a TNL tunnel transmission setup request transmitted by a donor centralized unit, the TNL tunnel transmission setup request including an endpoint TNL address of a TNL tunnel of the first donor distributed unit, wherein the TNL tunnel transmission setup request is used to request the second donor distributed unit to set up a TNL tunnel or activate the TNL tunnel transmission of uplink data, wherein, the TNL tunnel transmission setup request further includes at least one of the following: a source TNL address of an uplink F1 user plane needing to activate the TNL tunnel transmission, a source TNL address of an uplink F1 control plane needing to activate the TNL tunnel transmission, or a source TNL address of uplink non-F1 data needing to activate the TNL tunnel transmission.

In some embodiments, the transmitting portion 1903 further transmits a TNL tunnel transmission setup response to a donor centralized unit, the TNL tunnel transmission setup response including an endpoint TNL address of a TNL tunnel of the second donor distributed unit, wherein, the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

In some embodiments, the receiving portion 1901 further receives service mapping information transmitted by a donor centralized unit, the service mapping information being used to configure a backhaul adaptive protocol (BAP) routing identifier of downlink data transmitted via a TNL tunnel and a backhaul RLC channel between the second donor distributed unit and a next hop of descendant node.

In some embodiments, the receiving portion 1901 further receives a TNL tunnel transmission update or release request transmitted by a donor centralized unit, the TNL tunnel transmission update or release request including an endpoint TNL address of a TNL tunnel of a first donor distributed unit, and being used to request the second donor distributed unit to deactivate TNL tunnel transmission of the uplink data or release the TNL tunnel, wherein, the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, or a source TNL address of the uplink non-F1 data needing to deactivate the TNL tunnel transmission.

In some embodiments, the transmitting portion 1903 further transmits a TNL tunnel transmission update or release response to a donor centralized unit, the TNL tunnel transmission update or release response including an endpoint TNL address of a TNL tunnel of the second donor distributed unit, wherein, the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

In some embodiments, the receiving portion 1901 further receives a service mapping information release indication transmitted by a donor centralized unit, the service mapping information release indication being used to release configuration of a BAP routing identifier of downlink data deactivated TNL tunnel transmission and configuration of a backhaul RLC channel between the second donor distributed unit and the next hop of descendant node.

In some embodiments, the IAB node performs multi-path distribution in the donor centralized unit, and the first donor distributed unit and the second donor distributed unit belong to the same donor centralized unit.

In some embodiments, the receiving portion 1901 receives a TNL tunnel transmission setup request transmitted by a donor centralized unit, the TNL tunnel transmission setup request including an endpoint TNL address of the TNL tunnel of the first donor distributed unit, wherein the TNL tunnel transmission setup request is used to request the second donor distributed unit to set up a TNL tunnel or activate the TNL tunnel transmission of uplink data, wherein, the TNL tunnel transmission setup request further includes at least one of the following: a source TNL address of the uplink F1 user plane needing to activate the TNL tunnel transmission, a source TNL address of the uplink F1 control plane needing to activate the TNL tunnel transmission, a source TNL address of the uplink non-F1 data needing to activate the TNL tunnel transmission, or a GTP tunnel endpoint identifier of the uplink F1 user plane needing to activate the TNL tunnel transmission.

In some embodiments, the transmitting portion 1903 further transmits a TNL tunnel transmission setup response to a donor centralized unit, the TNL tunnel transmission setup response including an endpoint TNL address of a TNL tunnel of the second donor distributed unit, wherein, the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

In some embodiments, the receiving portion 1901 further receives service mapping information configured by a donor centralized unit, the service mapping information being used to configure a BAP routing identifier of downlink data transmitted via a TNL tunnel and a backhaul RLC channel between the second donor distributed unit and a next hop of descendant node.

In some embodiments, the receiving portion 1901 further receives a TNL tunnel transmission update or release request transmitted by a donor centralized unit, the TNL tunnel transmission update or release request including an endpoint TNL address of a TNL tunnel of a first donor distributed unit, and being used to request the second donor distributed unit to deactivate TNL tunnel transmission of the uplink data or release the TNL tunnel, wherein, the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, a source TNL address of the uplink non-F1 data needing to deactivate the TNL tunnel transmission, or a GTP TEID of the uplink F1 user plane needing to deactivate the TNL tunnel transmission.

In some embodiments, the transmitting portion 1903 further transmits a TNL tunnel transmission update or release response to a donor centralized unit, the TNL tunnel transmission update or release response including an endpoint TNL address of a TNL tunnel of the second donor distributed unit, wherein, the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

In some embodiments, the receiving portion 1901 further receives a service mapping information release indication transmitted by a donor centralized unit, the service mapping information release indication being used to release configuration of a BAP routing identifier of downlink data deactivated TNL tunnel transmission and configuration of a backhaul RLC channel between the second donor distributed unit and the next hop of descendant node.

In some embodiments, an IAB node switches from a first donor distributed unit to a second donor distributed unit, or RRC is reestablished to the second donor distributed unit after a radio link failure from the IAB node to the first donor distributed unit, the first donor distributed unit belonging to a first donor centralized unit, and the second donor distributed unit belonging to a second donor centralized unit.

In some embodiments, the receiving portion 1901 further receives a TNL tunnel transmission setup request transmitted by a second donor centralized unit, the TNL tunnel transmission setup request including an endpoint TNL address of the TNL tunnel of the first donor distributed unit, wherein the TNL tunnel transmission setup request is used to request the second donor distributed unit to set up a TNL tunnel or activate the TNL tunnel transmission of uplink data, wherein, the TNL tunnel transmission setup request further includes at least one of the following: a source TNL address of an uplink F1 user plane needing to activate the TNL tunnel transmission, a source TNL address of an uplink F1 control plane needing to activate the TNL tunnel transmission, or a source TNL address of uplink non-F1 data needing to activate the TNL tunnel transmission.

In some embodiments, the transmitting portion 1903 further transmits a TNL tunnel transmission setup response to a second donor centralized unit, the TNL tunnel transmission setup response including an endpoint TNL address of a TNL tunnel of the second donor distributed unit, wherein, the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

In some embodiments, the receiving portion 1901 further receives service mapping information transmitted by a donor centralized unit, the service mapping information being used to configure a BAP routing identifier of downlink data transmitted via a TNL tunnel and a backhaul RLC channel between the second donor distributed unit and a next hop of descendant node.

In some embodiments, the receiving portion 1901 further receives a TNL tunnel transmission update or release request transmitted by a second donor centralized unit, the TNL tunnel transmission update or release request including an endpoint TNL address of a TNL tunnel of a first donor distributed unit, and being used to request the second donor distributed unit to deactivate TNL tunnel transmission of the uplink data or release the TNL tunnel, wherein, the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, or a source TNL address of the uplink non-F1 data needing to deactivate the TNL tunnel transmission.

In some embodiments, the transmitting portion 1903 further transmits a TNL tunnel transmission update or release response to a second donor centralized unit, the TNL tunnel transmission update or release response including an endpoint TNL address of a TNL tunnel of the second donor distributed unit, wherein, the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

In some embodiments, the receiving portion 1901 further receives a service mapping information release indication transmitted by a donor centralized unit, the service mapping information release indication being used to release configuration of a BAP routing identifier of downlink data deactivated TNL tunnel transmission and configuration of a backhaul RLC channel between the second donor distributed unit and the next hop of descendant node.

In some embodiments, the IAB node performs multi-path distribution across the donor centralized units, the first donor distributed unit belongs to a first donor centralized unit, and the second donor distributed unit belongs to a second donor centralized unit.

In some embodiments, the receiving portion 1901 further receives a TNL tunnel transmission setup request transmitted by a second donor centralized unit, the TNL tunnel transmission setup request including an endpoint TNL address of the TNL tunnel of the first donor distributed unit, wherein the TNL tunnel transmission setup request is used to request the second donor distributed unit to set up a TNL tunnel or activate the TNL tunnel transmission of uplink data, wherein, the TNL tunnel transmission setup request further includes at least one of the following: a source TNL address of the uplink F1 user plane needing to activate the TNL tunnel transmission, a source TNL address of the uplink F1 control plane needing to activate the TNL tunnel transmission, a source TNL address of the uplink non-F1 data needing to activate the TNL tunnel transmission, or a GTP TEID of the uplink F1 user plane needing to activate the TNL tunnel transmission.

In some embodiments, the transmitting portion 1903 further transmits a TNL tunnel transmission setup response to a second donor centralized unit, the TNL tunnel transmission setup response including an endpoint TNL address of a TNL tunnel of the second donor distributed unit, wherein, the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

In some embodiments, the receiving portion 1901 further receives service mapping information transmitted by a donor centralized unit, the service mapping information being used to configure a BAP routing identifier of downlink data transmitted via a TNL tunnel and a backhaul RLC channel between the second donor distributed unit and a next hop of descendant node.

In some embodiments, the receiving portion 1901 further receives a TNL tunnel transmission update or release request transmitted by a second donor centralized unit, the TNL tunnel transmission update or release request including an endpoint TNL address of a TNL tunnel of a first donor distributed unit, and being used to request the second donor distributed unit to deactivate TNL tunnel transmission of the uplink data or release the TNL tunnel, wherein, the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, a source TNL address of the uplink non-F1 data needing to deactivate the TNL tunnel transmission, or a GTP TEID of the uplink F1 user plane needing to deactivate the TNL tunnel transmission.

In some embodiments, the transmitting portion 1903 further transmits a TNL tunnel transmission update or release response to a second donor centralized unit, the TNL tunnel transmission update or release response including an endpoint TNL address of a TNL tunnel of the second donor distributed unit, wherein, the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

In some embodiments, the receiving portion 1901 further receives a service mapping information release indication transmitted by a donor centralized unit, the service mapping information release indication being used to release configuration of a BAP routing identifier of downlink data deactivated TNL tunnel transmission and configuration of a backhaul RLC channel between the second donor distributed unit and the next hop of descendant node.

In some embodiments, the receiving portion 1901 receives downlink data transmitted to an IAB node; the processing portion 1902 adds a header related to a transport network layer tunnel to the downlink data; and the transmitting portion 1903 transmits the downlink data to a second donor distributed unit via the transport network layer tunnel.

In some embodiments, the header includes at least one of the following: an Internet Protocol header, a General Packet Radio Service Tunneling Protocol header, a User Datagram Protocol header or a Transmission Control Protocol header;

In some embodiments, a source transport network layer address of the header is a transport network layer address of the first donor distributed unit or a TNL address that is able to be routed by the first donor distributed unit, and a target transport network layer address of the header is a transport network layer address of the second donor distributed unit.

In some embodiments, an IAB node switches from a first donor distributed unit to a second donor distributed unit, or RRC is reestablished to the second donor distributed unit after a radio link failure from the IAB node to the first donor distributed unit, wherein the first donor distributed unit and the second donor distributed unit belong to the same donor centralized unit.

In some embodiments, the receiving portion 1901 further receives a TNL tunnel transmission setup request transmitted by a donor centralized unit, the TNL tunnel transmission setup request including an endpoint TNL address of the TNL tunnel of the second donor distributed unit; the TNL tunnel transmission setup request is used to request the first donor distributed unit to set up a TNL tunnel or activate the TNL tunnel transmission of downlink data, wherein, the TNL tunnel transmission setup request further includes at least one of the following: a target TNL address of a downlink F1 user plane needing to activate the TNL tunnel transmission, a target TNL address of a downlink F1 control plane needing to activate the TNL tunnel transmission, or a target TNL address of downlink non-F1 data needing to activate the TNL tunnel transmission.

In some embodiments, the transmitting portion 1903 further transmits a TNL tunnel transmission setup response to a donor centralized unit, the TNL tunnel transmission setup response including an endpoint TNL address of a TNL tunnel of the first donor distributed unit, wherein, the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

In some embodiments, the receiving portion 1901 further receives a TNL tunnel transmission update or release request transmitted by a donor centralized unit, the TNL tunnel transmission update or release request including an endpoint TNL address of a TNL tunnel of a second donor distributed unit, wherein, the TNL tunnel transmission update or release request is used to request the first donor distributed unit to deactivate TNL tunnel transmission of the downlink data or release the TNL tunnel, wherein, the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, or a target TNL address of the downlink non-F1 data needing to deactivate the TNL tunnel transmission.

In some embodiments, the transmitting portion 1903 further transmits a TNL tunnel transmission update or release response to a donor centralized unit, the TNL tunnel transmission update or release response including an endpoint TNL address of a TNL tunnel of the first donor distributed unit, wherein, the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

In some embodiments, the IAB node performs multi-path distribution in the donor centralized unit, and the first donor distributed unit and the second donor distributed unit belong to the same donor centralized unit.

In some embodiments, the receiving portion 1901 further receives a TNL tunnel transmission setup request transmitted by a donor centralized unit, the TNL tunnel transmission setup request including an endpoint TNL address of the TNL tunnel of the second donor distributed unit; the TNL tunnel transmission setup request is used to request the first donor distributed unit to set up a TNL tunnel or activate the TNL tunnel transmission of downlink data, wherein, the TNL tunnel transmission setup request further includes at least one of the following: a target TNL address of the downlink F1 user plane needing to activate TNL tunnel transmission, a target TNL address of the downlink F1 control plane needing to activate the TNL tunnel transmission, a target TNL address of the downlink non-F1 data needing to activate the TNL tunnel transmission, or a GTP TEID of the downlink F1 user plane needing to activate the TNL tunnel transmission.

In some embodiments, the transmitting portion 1903 further transmits a TNL tunnel transmission setup response to a donor centralized unit, the TNL tunnel transmission setup response including an endpoint TNL address of a TNL tunnel of the first donor distributed unit, wherein, the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

In some embodiments, the receiving portion 1901 further receives a TNL tunnel transmission update or release request transmitted by a donor centralized unit, the TNL tunnel transmission update or release request including an endpoint TNL address of a TNL tunnel of a second donor distributed unit, wherein, the TNL tunnel transmission update or release request is used to request the first donor distributed unit to deactivate TNL tunnel transmission of the downlink data or release the TNL tunnel, wherein, the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, a target TNL address of the downlink non-F1 data needing to deactivate the TNL tunnel transmission, or a GTP TEID of the downlink F1 user plane needing to deactivate the TNL tunnel transmission.

In some embodiments, the transmitting portion 1903 further transmits a TNL tunnel transmission update or release response to a donor centralized unit, the TNL tunnel transmission update or release response including an endpoint TNL address of a TNL tunnel of the first donor distributed unit, wherein, the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

In some embodiments, an IAB node switches from a first donor distributed unit to the second donor distributed unit, or RRC is reestablished to the second donor distributed unit after a radio link failure from the IAB node to the first donor distributed unit, the first donor distributed unit belonging to a first donor centralized unit, and the second donor distributed unit belonging to a second donor centralized unit.

In some embodiments, the receiving portion 1901 further receives a TNL tunnel transmission setup request transmitted by a first donor centralized unit, the TNL tunnel transmission setup request including an endpoint TNL address of the TNL tunnel of the second donor distributed unit; the TNL tunnel transmission setup request is used to request the first donor distributed unit to set up a TNL tunnel or activate the TNL tunnel transmission of downlink data, wherein, the TNL tunnel transmission setup request further includes at least one of the following: a target TNL address of a downlink F1 user plane needing to activate the TNL tunnel transmission, a target TNL address of a downlink F1 control plane needing to activate the TNL tunnel transmission, or a target TNL address of downlink non-F1 data needing to activate the TNL tunnel transmission.

In some embodiments, the transmitting portion 1903 further transmits a TNL tunnel transmission setup response to a first donor centralized unit, the TNL tunnel transmission setup response including an endpoint TNL address of a TNL tunnel of the first donor distributed unit, wherein, the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

In some embodiments, the receiving portion 1901 further receives a TNL tunnel transmission update or release request transmitted by a first donor centralized unit, the TNL tunnel transmission update or release request including an endpoint TNL address of a TNL tunnel of a second donor distributed unit, wherein, the TNL tunnel transmission update or release request is used to request the first donor distributed unit to deactivate TNL tunnel transmission of the downlink data or release the TNL tunnel, wherein, the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, or a target TNL address of the downlink non-F1 data needing to deactivate the TNL tunnel transmission.

In some embodiments, the transmitting portion 1903 further transmits a TNL tunnel transmission update or release response to a first donor centralized unit, the TNL tunnel transmission update or release response including an endpoint TNL address of a TNL tunnel of the first donor distributed unit, wherein, the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

In some embodiments, the IAB node performs multi-path distribution across the donor centralized units, the first donor distributed unit belongs to a first donor centralized unit, and the second donor distributed unit belongs to a second donor centralized unit.

In some embodiments, the receiving portion 1901 further receives a TNL tunnel transmission setup request transmitted by a first donor centralized unit, the TNL tunnel transmission setup request including an endpoint TNL address of the TNL tunnel of the second donor distributed unit; the TNL tunnel transmission setup request is used to request the first donor distributed unit to set up a TNL tunnel or activate the TNL tunnel transmission of downlink data, wherein, the TNL tunnel transmission setup request further includes at least one of the following: a target TNL address of the downlink F1 user plane needing to activate TNL tunnel transmission, a target TNL address of the downlink F1 control plane needing to activate the TNL tunnel transmission, a target TNL address of the downlink non-F1 data needing to activate the TNL tunnel transmission, or a GTP TEID of the downlink F1 user plane needing to activate the TNL tunnel transmission.

In some embodiments, the transmitting portion 1903 further transmits a TNL tunnel transmission setup response to a first donor centralized unit, the TNL tunnel transmission setup response including an endpoint TNL address of a TNL tunnel of the first donor distributed unit, wherein, the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

In some embodiments, the receiving portion 1901 further receives a TNL tunnel transmission update or release request transmitted by a first donor centralized unit, the TNL tunnel transmission update or release request including an endpoint TNL address of a TNL tunnel of a second donor distributed unit, wherein, the TNL tunnel transmission update or release request is used to request the first donor distributed unit to deactivate TNL tunnel transmission of the downlink data or release the TNL tunnel, wherein, the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, a target TNL address of the downlink non-F1 data needing to deactivate the TNL tunnel transmission, or a GTP TEID of the downlink F1 user plane needing to deactivate the TNL tunnel transmission.

In some embodiments, the transmitting portion 1903 further transmits a TNL tunnel transmission update or release response to a first donor centralized unit, the TNL tunnel transmission update or release response including an endpoint TNL address of a TNL tunnel of the first donor distributed unit, wherein, the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

It should be noted that the above only describes components or modules related to the present disclosure, but the present disclosure is not limited to this. The IAB communication device 1900 in the embodiments of the present disclosure may further include other components or modules. For detailed contents of these components or modules, relevant technologies can be referred to.

Moreover, for the sake of simplicity, FIG. 19 only demonstratively shows a connection relationship or signal direction between components or modules, however persons skilled in the art should know that various relevant technologies such as bus connection can be used. The above components or modules can be realized by a hardware facility such as a processor, a memory, a transmitter, a receiver, etc. The embodiments of the present disclosure have no limitation to this.

Hence, a second donor distributed unit (a target donor-DU) adds a header related to a TNL tunnel to uplink data, and transmits the uplink data to a first donor distributed unit (a source donor-DU) via the TNL tunnel; and/or a first donor distributed unit (a source donor-DU) adds a header related to a TNL tunnel to downlink data, and transmits the downlink data to a second donor distributed unit (a target donor-DU) via the TNL tunnel, thereby establishing a TNL tunnel between the source donor-DU and the target donor-DU of the IAB-node migration, which may solve the problem that uplink or downlink data is discarded.

Embodiments of a Fifth Aspect

The embodiments of the present disclosure provide a communication system, including a donor (Donor) equipment and an IAB node (IAB-node); for a network architecture of the donor (Donor) equipment and the IAB node, relevant technologies may be further referred to, description is omitted here.

The embodiments of the present disclosure further provide a Donor equipment.

Figure 20:
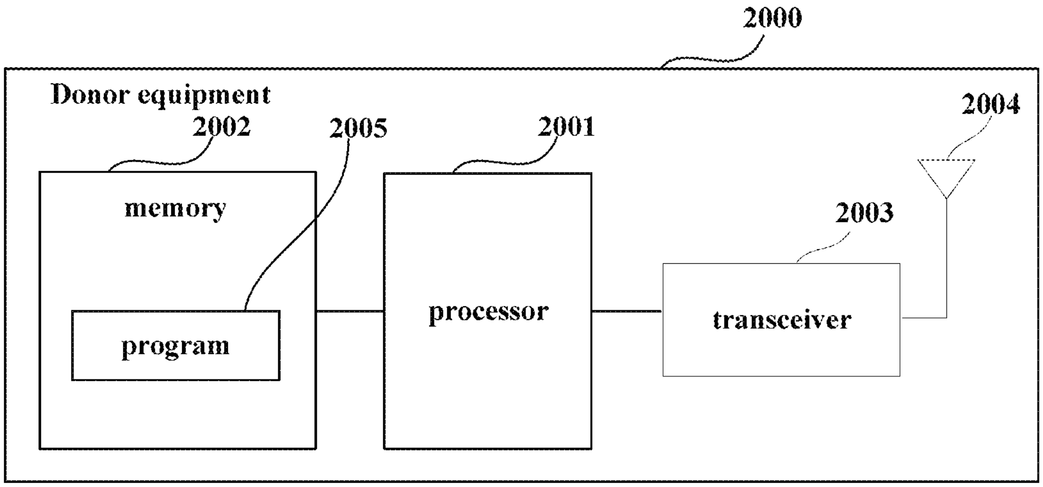
FIG. 20 is a schematic diagram of a Donor equipment in the embodiments of the present disclosure.

FIG. 20 is a schematic diagram of a Donor equipment in the embodiments of the present disclosure. As shown in FIG. 20, a Donor equipment 2000 may include: a processor (such as a central processing unit (CPU)) 2001 and a memory 2002; the memory 2002 is coupled to the processor 2001. The memory 2002 may store various data; moreover, also stores a program 2005 for information processing, and executes the program 2005 under the control of the central processor 2001.

For example, the processor 2001 may be configured to execute a program to implement the IAB communication method in the embodiments of the first aspect. For example, the processor 2001 may be configured to perform the following control: receive uplink data transmitted by an IAB node; add a header related to a TNL tunnel to the uplink data; and transmit the uplink data to a first donor distributed unit via the transport network layer (TNL) tunnel.

For another example, the processor 2001 may be configured to execute a program to implement the IAB communication method in the embodiments of the second aspect. For example, the processor 2001 may be configured to perform the following control: receive downlink data transmitted to an IAB node; add a header related to a TNL tunnel to the downlink data; and transmit the downlink data to a second donor distributed unit via the transport network layer (TNL) tunnel.

For another example, the processor 2001 may be configured to execute a program to implement the IAB communication method in the embodiments of the third aspect. For example, the processor 2001 may be configured to perform the following control: indicate a second donor distributed unit to receive uplink data transmitted by an IAB-node, and to transmit the uplink data to a first donor distributed unit via a transport network layer (TNL) tunnel between the second donor distributed unit and the first donor distributed unit.

Or, the processor 2001 may be configured to perform the following control: indicate a first donor distributed unit to receive downlink data transmitted to an IAB-node, and to transmit the downlink data to a second donor distributed unit via a transport network layer (TNL) tunnel between the first donor distributed unit and the second donor distributed unit.

In addition, as shown in FIG. 20, the Donor equipment 2000 may further include: a transceiver 2003 and an antenna 2004, etc., wherein the functions of said components are similar to relevant arts, which are not repeated here. It should be noted that the Donor equipment 2000 does not have to include all the components shown in FIG. 20. Moreover, the Donor equipment 2000 may also include components not shown in FIG. 20, relevant art may be referred to.

The embodiments of the present disclosure further provide a computer readable program, wherein when a Donor equipment executes the program, the program enables a computer to execute the IAB communication method in the embodiments of the first to third aspects, in the Donor equipment.

The embodiments of the present disclosure further provide a storage medium in which a computer readable program is stored, wherein the computer readable program enables a computer to execute the IAB communication method in the embodiments of the first to third aspects, in the Donor equipment.

The apparatus and method in the present disclosure can be realized by hardware, or can be realized by combining hardware with software. The present disclosure relates to such a computer readable program, when the program is executed by a logic component, the computer readable program enables the logic component to realize the apparatus described in the above text or a constituent component, or enables the logic component to realize various methods or steps described in the above text. The logic component is e.g. a field programmable logic component, a microprocessor, a processor used in a computer, etc. The present disclosure also relates to a storage medium storing the program, such as a hard disk, a magnetic disk, an optical disk, a DVD, a flash memory and the like.

By combining with the method/apparatus described in the embodiments of the present disclosure, it can be directly reflected as hardware, a software executed by a processor, or a combination of the two. For example, one or more in the functional block diagram or one or more combinations in the functional block diagram as shown in the figures may correspond to software modules of a computer program flow, and may also correspond to hardware modules. These software modules may respectively correspond to the steps as shown in the figures. These hardware modules can be realized by solidifying these software modules e.g. using a field-programmable gate array (FPGA).

A software module can be located in a RAM memory, a flash memory, a ROM memory, an EPROM memory, an EEPROM memory, a register, a hard disk, a mobile magnetic disk, a CD-ROM or a storage medium in any other form as known in this field. A storage medium can be coupled to a processor, thereby enabling the processor to read information from the storage medium, and to write the information into the storage medium; or the storage medium can be a constituent part of the processor. The processor and the storage medium can be located in an ASIC. The software module can be stored in a memory of a mobile terminal, and may also be stored in a memory card of the mobile terminal. For example, if a device (such as the mobile terminal) adopts a MEGA-SIM card with a larger capacity or a flash memory apparatus with a large capacity, the software module can be stored in the MEGA-SIM card or the flash memory apparatus with a large capacity.

One or more in the functional block diagram or one or more combinations in the functional block diagram as described in the figures can be implemented as a general-purpose processor for performing the functions described in the present disclosure, a digital signal processor (DSP), an application-specific integrated circuit (ASIC), a field-programmable gate array (FPGA) or other programmable logic device, discrete gate or transistor logic device, discrete hardware components or any combination thereof. One or more in the functional block diagram or one or more combinations in the functional block diagram as described in the figures can be also implemented as a combination of computer equipments, such as a combination of a DSP and a microprocessor, a plurality of microprocessors, one or more microprocessors combined and communicating with the DSP or any other such configuration.

The present disclosure is described by combining with the specific implementations, however persons skilled in the art should clearly know that these descriptions are exemplary and do not limit the protection scope of the present disclosure. Persons skilled in the art can make various variations and modifications to the present disclosure based on the spirit and principle of the present disclosure, these variations and modifications are also within the scope of the present disclosure.

Regarding the above implementations disclosed in this embodiment, the following supplements are further disclosed:

1. An integrated access and backhaul (IAB) communication method, wherein an IAB node is migrated from a first donor distributed unit (donor-DU) to a second donor distributed unit, and a transport network layer (TNL) tunnel is set up between the first donor distributed unit and the second donor distributed unit; the method includes:

receiving, by the second donor distributed unit, uplink data transmitted by the IAB node;

adding, by the second donor distributed unit, a header related to the tunnel to the uplink data; and transmitting, by the second donor distributed unit, the uplink data to the first donor distributed unit via the transport network layer (TNL) tunnel.

2. The method according to the supplement 1, wherein the header includes at least one of the following: an Internet Protocol (IP) header, a General Packet Radio Service (GPRS) Tunneling Protocol (GTP) header, a User Datagram Protocol (UDP) header or a Transmission Control Protocol (TCP) header.

3. The method according to the supplement 1, wherein a source transport network layer (TNL) address of the header is a TNL address of the second donor distributed unit or a TNL address that is able to be routed by the second donor distributed unit, and a target TNL address of the header is a TNL address of the first donor distributed unit.

4. The method according to the supplement 1, wherein the IAB node switches from the first donor distributed unit to the second donor distributed unit, or radio resource control (RRC) is reestablished to the second donor distributed unit after a radio link failure (RLF) from the IAB node to the first donor distributed unit, wherein the first donor distributed unit and the second donor distributed unit belong to the same donor centralized unit (donor-CU).

5. The method according to the supplement 4, wherein the method further includes:

receiving, by the second donor distributed unit, a TNL tunnel transmission setup request transmitted by the donor centralized unit, the TNL tunnel transmission setup request including the endpoint TNL address of the TNL tunnel of the first donor distributed unit; wherein the TNL tunnel transmission setup request is used to request the second donor distributed unit to set up the TNL tunnel or activate the TNL tunnel transmission of the uplink data.

6. The method according to the supplement 5, wherein after the donor centralized unit receives a switching completion message of the IAB-node, or after the donor centralized unit receives an RRC reestablishment completion message of the IAB-node, or when the donor centralized unit does not configure the TNL address allocated by the second donor distributed unit for the IAB-node, the second donor distributed unit receives the TNL tunnel transmission setup request transmitted by the donor centralized unit.

7. The method according to the supplement 5, wherein the TNL tunnel transmission setup request further includes at least one of the following: a source TNL address of an uplink F1 user plane needing to activate the TNL tunnel transmission, a source TNL address of an uplink F1 control plane needing to activate the TNL tunnel transmission, or a source TNL address of uplink non-F1 data needing to activate the TNL tunnel transmission.

8. The method according to the supplement 5, wherein the method further includes:

transmitting, by the second donor distributed unit, a TNL tunnel transmission setup response to the donor centralized unit, the TNL tunnel transmission setup response including an endpoint TNL address of a TNL tunnel of the second donor distributed unit.

9. The method according to the supplement 8, wherein the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

10. The method according to the supplement 4, wherein the second donor distributed unit further receives service mapping information transmitted by the donor centralized unit, the service mapping information being used to configure a backhaul adaptive protocol (BAP) routing identifier of downlink data transmitted via the TNL tunnel and a backhaul RLC channel between the second donor distributed unit and a next hop of descendant node.

11. The method according to the supplement 4, wherein the method further includes:

receiving, by the second donor distributed unit, a TNL tunnel transmission update or release request transmitted by the donor centralized unit, the TNL tunnel transmission update or release request including the endpoint TNL address of the TNL tunnel of the first donor distributed unit, and being used to request the second donor distributed unit to deactivate TNL tunnel transmission of the uplink data or release the TNL tunnel.

12. The method according to the supplement 11, wherein after the donor centralized unit configures for the IAB-node a TNL address allocated by the second donor distributed unit, or after the IAB-node completes a preset time of switching, or after the IAB-node completes a preset time of reestablishment, the second donor distributed unit receives the TNL tunnel transmission update or release request transmitted by the donor centralized unit.

13. The method according to the supplement 11, wherein the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, or a source TNL address of the uplink non-F1 data needing to deactivate the TNL tunnel transmission.

14. The method according to the supplement 11, wherein the method further includes:

transmitting, by the second donor distributed unit, a TNL tunnel transmission update or release response to the donor centralized unit, the TNL tunnel transmission update or release response including the endpoint TNL address of the TNL tunnel of the second donor distributed unit.

15. The method according to the supplement 14, wherein the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

16. The method according to the supplement 4, wherein the second donor distributed unit further receives a service mapping information release indication transmitted by the donor centralized unit, the service mapping information release indication being used to release configuration of the BAP routing identifier of the downlink data deactivated the TNL tunnel transmission and configuration of the backhaul RLC channel between the second donor distributed unit and the next hop of descendant node.

17. The method according to the supplement 1, wherein the IAB node performs multi-path distribution in the donor centralized unit (intra-donor CU), and the first donor distributed unit and the second donor distributed unit belong to the same donor centralized unit (donor-CU).

18. The method according to the supplement 17, wherein the method further includes:

receiving, by the second donor distributed unit, a TNL tunnel transmission setup request transmitted by the donor centralized unit, the TNL tunnel transmission setup request including the endpoint TNL address of the TNL tunnel of the first donor distributed unit, wherein the TNL tunnel transmission setup request is used to request the second donor distributed unit to set up the TNL tunnel or activate the TNL tunnel transmission of the uplink data.

19. The method according to the supplement 18, wherein in a case where the donor centralized unit configures a backhaul adaptive protocol (BAP) routing of the IAB-node as a BAP routing identifier of the second donor distributed unit but does not configure a TNL address allocated by the second donor distributed unit, the second donor distributed unit receives the TNL tunnel transmission setup request transmitted by the donor centralized unit.

20. The method according to the supplement 18, wherein the TNL tunnel transmission setup request further includes at least one of the following: a source TNL address of the uplink F1 user plane needing to activate the TNL tunnel transmission, a source TNL address of the uplink F1 control plane needing to activate the TNL tunnel transmission, a source TNL address of the uplink non-F1 data needing to activate the TNL tunnel transmission, or a GTP tunnel endpoint identifier (TEID) of the uplink F1 user plane needing to activate the TNL tunnel transmission.

21. The method according to the supplement 18, wherein the method further includes:

transmitting, by the second donor distributed unit, a TNL tunnel transmission setup response to the donor centralized unit, the TNL tunnel transmission setup response including an endpoint TNL address of a TNL tunnel of the second donor distributed unit.

22. The method according to the supplement 21, wherein the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

23. The method according to the supplement 17, wherein the second donor distributed unit further receives service mapping information configured by the donor centralized unit, the service mapping information being used to configure a BAP routing identifier of downlink data transmitted via the TNL tunnel and a backhaul RLC channel between the second donor distributed unit and a next hop of descendant node.

24. The method according to the supplement 17, wherein the method further includes:

receiving, by the second donor distributed unit, a TNL tunnel transmission update or release request transmitted by the donor centralized unit, the TNL tunnel transmission update or release request including the endpoint TNL address of the TNL tunnel of the first donor distributed unit, and being used to request the second donor distributed unit to deactivate TNL tunnel transmission of the uplink data or release the TNL tunnel.

25. The method according to the supplement 24, wherein after the donor centralized unit configures for the IAB-node a TNL address allocated by the second donor distributed unit, the second donor distributed unit receives the TNL tunnel transmission update or release request transmitted by the donor centralized unit.

26. The method according to the supplement 24, wherein the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, a source TNL address of the uplink non-F1 data needing to deactivate the TNL tunnel transmission, or a GTP TEID of the uplink F1 user plane needing to deactivate the TNL tunnel transmission.

27. The method according to the supplement 24, wherein the method further includes:

transmitting, by the second donor distributed unit, a TNL tunnel transmission update or release response to the donor centralized unit, the TNL tunnel transmission update or release response including the endpoint TNL address of the TNL tunnel of the second donor distributed unit.

28. The method according to the supplement 27, wherein the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

29. The method according to the supplement 17, wherein the second donor distributed unit further receives a service mapping information release indication transmitted by the donor centralized unit, the service mapping information release indication being used to release configuration of the BAP routing identifier of the downlink data deactivated the TNL tunnel transmission and configuration of the backhaul RLC channel between the second donor distributed unit and the next hop of descendant node.

30. The method according to the supplement 1, wherein the IAB node switches from the first donor distributed unit to the second donor distributed unit, or RRC is reestablished to the second donor distributed unit after a radio link failure (RLF) from the IAB node to the first donor distributed unit, the first donor distributed unit belonging to a first donor centralized unit, and the second donor distributed unit belonging to a second donor centralized unit.

31. The method according to the supplement 30, wherein the method further includes:

receiving, by the second donor distributed unit, a TNL tunnel transmission setup request transmitted by the second donor centralized unit, the TNL tunnel transmission setup request including the endpoint TNL address of the TNL tunnel of the first donor distributed unit, wherein the TNL tunnel transmission setup request is used to request the second donor distributed unit to set up the TNL tunnel or activate the TNL tunnel transmission of the uplink data.

32. The method according to the supplement 31, wherein after the second donor centralized unit receives a switching completion message of the IAB-node, or after the second donor centralized unit receives an RRC reestablishment completion message of the IAB-node, or when the second donor centralized unit does not configure the TNL address allocated by the second donor distributed unit for the IAB-node, the second donor distributed unit receives the TNL tunnel transmission setup request transmitted by the second donor centralized unit.

33. The method according to the supplement 31, wherein the TNL tunnel transmission setup request further includes at least one of the following: a source TNL address of an uplink F1 user plane needing to activate the TNL tunnel transmission, a source TNL address of an uplink F1 control plane needing to activate the TNL tunnel transmission, or a source TNL address of uplink non-F1 data needing to activate the TNL tunnel transmission.

34. The method according to the supplement 31, wherein the method further includes:

transmitting, by the second donor distributed unit, a TNL tunnel transmission setup response to the second donor centralized unit, the TNL tunnel transmission setup response including an endpoint TNL address of a TNL tunnel of the second donor distributed unit.

35. The method according to the supplement 34, wherein the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.

36. The method according to the supplement 30, wherein the second donor distributed unit further receives service mapping information transmitted by the donor centralized unit, the service mapping information being used to configure a BAP routing identifier of downlink data transmitted via the TNL tunnel and a backhaul RLC channel between the second donor distributed unit and a next hop of descendant node.

37. The method according to the supplement 30, wherein the method further includes:

receiving, by the second donor distributed unit, a TNL tunnel transmission update or release request transmitted by the second donor centralized unit, the TNL tunnel transmission update or release request including the endpoint TNL address of the TNL tunnel of the first donor distributed unit, and being used to request the second donor distributed unit to deactivate TNL tunnel transmission of the uplink data or release the TNL tunnel.

38. The method according to the supplement 37, wherein after the second donor centralized unit configures for the IAB-node a TNL address allocated by the second donor distributed unit, or after the IAB-node completes a preset time of switching, or after the IAB-node completes a preset time of reestablishment, the second donor distributed unit receives the TNL tunnel transmission update or release request transmitted by the second donor centralized unit.

39. The method according to the supplement 37, wherein the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, or a source TNL address of the uplink non-F1 data needing to deactivate the TNL tunnel transmission.

40. The method according to the supplement 37, wherein the method further includes:

transmitting, by the second donor distributed unit, a TNL tunnel transmission update or release response to the second donor centralized unit, the TNL tunnel transmission update or release response including the endpoint TNL address of the TNL tunnel of the second donor distributed unit.

41. The method according to the supplement 40, wherein the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.

42. The method according to the supplement 30, wherein the second donor distributed unit further receives a service mapping information release indication transmitted by the donor centralized unit, the service mapping information release indication being used to release configuration of the BAP routing identifier of the downlink data deactivated the TNL tunnel transmission and configuration of the backhaul RLC channel between the second donor distributed unit and the next hop of descendant node.

43. The method according to the supplement 1, wherein the IAB node performs multi-path distribution across the donor centralized units (inter-donor CU), the first donor distributed unit belongs to a first donor centralized unit, and the second donor distributed unit belongs to a second donor centralized unit.

44. The method according to the supplement 43, wherein the method further includes:

receiving, by the second donor distributed unit, a TNL tunnel transmission setup request transmitted by the second donor centralized unit, the TNL tunnel transmission setup request including the endpoint TNL address of the TNL tunnel of the first donor distributed unit, wherein the TNL tunnel transmission setup request is used to request the second donor distributed unit to set up the TNL tunnel or activate the TNL tunnel transmission of the uplink data.

45. The method according to the supplement 44, wherein in a case where the second donor centralized unit configures a backhaul adaptive protocol (BAP) routing of the IAB-node as a BAP routing identifier of the second donor distributed unit but does not configure a TNL address allocated by the second donor distributed unit, the second donor distributed unit receives the TNL tunnel transmission setup request transmitted by the second donor centralized unit.

46. The method according to the supplement 44, wherein the TNL tunnel transmission setup request further includes at least one of the following: a source TNL address of the uplink F1 user plane needing to activate the TNL tunnel transmission, a source TNL address of the uplink F1 control plane needing to activate the TNL tunnel transmission, a source TNL address of the uplink non-F1 data needing to activate the TNL tunnel transmission, or a GTP TEID of the uplink F1 user plane needing to activate the TNL tunnel transmission.

47. The method according to the supplement 44, wherein the method further includes:
transmitting, by the second donor distributed unit, a TNL tunnel transmission setup response to the second donor centralized unit, the TNL tunnel transmission setup response including an endpoint TNL address of a TNL tunnel of the second donor distributed unit.
48. The method according to the supplement 47, wherein the TNL tunnel transmission setup response further includes at least one of the following: a source TNL address of an uplink F1 user plane successfully activating the TNL tunnel transmission, a source TNL address of an uplink F1 control plane successfully activating the TNL tunnel transmission, a source TNL address of uplink non-F1 data successfully activating the TNL tunnel transmission, or a source TNL address failing in being activated.
49. The method according to the supplement 43, wherein the second donor distributed unit further receives service mapping information transmitted by the donor centralized unit, the service mapping information being used to configure a BAP routing identifier of downlink data transmitted via the TNL tunnel and a backhaul RLC channel between the second donor distributed unit and a next hop of descendant node.
50. The method according to the supplement 43, wherein the method further includes:
receiving, by the second donor distributed unit, a TNL tunnel transmission update or release request transmitted by the second donor centralized unit, the TNL tunnel transmission update or release request including the endpoint TNL address of the TNL tunnel of the first donor distributed unit, and being used to request the second donor distributed unit to deactivate TNL tunnel transmission of the uplink data or release the TNL tunnel.
51. The method according to the supplement 50, wherein after the second donor centralized unit configures for the IAB-node a TNL address allocated by the second donor distributed unit, the second donor distributed unit receives the TNL tunnel transmission update or release request transmitted by the second donor centralized unit.
52. The method according to the supplement 50, wherein the TNL tunnel transmission update or release request further includes at least one of the following: a source TNL address of the uplink F1 user plane needing to deactivate the TNL tunnel transmission, a source TNL address of the uplink F1 control plane needing to deactivate the TNL tunnel transmission, a source TNL address of the uplink non-F1 data needing to deactivate the TNL tunnel transmission, or a GTP TEID of the uplink F1 user plane needing to deactivate the TNL tunnel transmission.
53. The method according to the supplement 50, wherein the method further includes:
transmitting, by the second donor distributed unit, a TNL tunnel transmission update or release response to the second donor centralized unit, the TNL tunnel transmission update or release response including the endpoint TNL address of the TNL tunnel of the second donor distributed unit.
54. The method according to the supplement 53, wherein the TNL tunnel transmission update or release response further includes at least one of the following: a source TNL address of an uplink F1 user plane successfully deactivating the TNL tunnel transmission, a source TNL address of an uplink F1 control plane successfully deactivating the TNL tunnel transmission, a source TNL address of uplink non-F1 data successfully deactivating the TNL tunnel transmission, or a source TNL address failing in being deactivated.
55. The method according to the supplement 43, wherein the second donor distributed unit further receives a service mapping information release indication transmitted by the donor centralized unit, the service mapping information release indication being used to release configuration of the BAP routing identifier of the downlink data deactivated the TNL tunnel transmission and configuration of the backhaul RLC channel between the second donor distributed unit and the next hop of descendant node.
56. An integrated access and backhaul (IAB) communication method, wherein an IAB node is migrated from a first donor distributed unit to a second donor distributed unit, and a transport network layer (TNL) tunnel is set up between the first donor distributed unit and the second donor distributed unit; the method includes:
receiving, by the first donor distributed unit, downlink data transmitted to the IAB node;
adding, by the first donor distributed unit, a header related to the TNL tunnel to the downlink data; and
transmitting, by the first donor distributed unit, the downlink data to the second donor distributed unit via the transport network layer (TNL) tunnel.
57. The method according to the supplement 56, wherein the header includes at least one of the following: an Internet Protocol (IP) header, a General Packet Radio Service (GPRS) Tunneling Protocol (GTP) header, a User Datagram Protocol (UDP) header or a Transmission Control Protocol (TCP) header.
58. The method according to the supplement 56, wherein a source transport network layer (TNL) address of the header is a transport network layer (TNL) address of the first donor distributed unit or a TNL address that is able to be routed by the first donor distributed unit, and a target transport network layer (TNL) address of the header is a transport network layer (TNL) address of the second donor distributed unit.
59. The method according to the supplement 56, wherein the IAB node switches from the first donor distributed unit to the second donor distributed unit, or RRC is reestablished to the second donor distributed unit after a radio link failure from the IAB node to the first donor distributed unit; wherein the first donor distributed unit and the second donor distributed unit belong to the same donor centralized unit (donor-CU).
60. The method according to the supplement 59, wherein the method further includes:
receiving, by the first donor distributed unit, a TNL tunnel transmission setup request transmitted by the donor centralized unit, the TNL tunnel transmission setup request including the endpoint TNL address of the TNL tunnel of the second donor distributed unit; the TNL tunnel transmission setup request is used to request the first donor distributed unit to set up the TNL tunnel or activate the TNL tunnel transmission of the downlink data.
61. The method according to the supplement 60, wherein after the donor centralized unit receives a switching completion message of the IAB-node, or after the donor centralized unit receives an RRC reestablishment completion message of the IAB-node, or when the donor centralized unit does not configure the TNL address allocated by the second donor distributed unit for the IAB-node, the first donor distributed unit receives the TNL tunnel transmission setup request transmitted by the donor centralized unit.

62. The method according to the supplement 60, wherein the TNL tunnel transmission setup request further includes at least one of the following: a target TNL address of a downlink F1 user plane needing to activate the TNL tunnel transmission, a target TNL address of a downlink F1 control plane needing to activate the TNL tunnel transmission, or a target TNL address of downlink non-F1 data needing to activate the TNL tunnel transmission.

63. The method according to the supplement 60, wherein the method further includes:

transmitting, by the first donor distributed unit, a TNL tunnel transmission setup response to the donor centralized unit, the TNL tunnel transmission setup response including an endpoint TNL address of a TNL tunnel of the first donor distributed unit.

64. The method according to the supplement 63, wherein the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

65. The method according to the supplement 60, wherein the method further includes:

receiving, by the first donor distributed unit, a TNL tunnel transmission update or release request transmitted by the donor centralized unit, the TNL tunnel transmission update or release request including the endpoint TNL address of the TNL tunnel of the second donor distributed unit, wherein the TNL tunnel transmission update or release request is used to request the first donor distributed unit to deactivate TNL tunnel transmission of the downlink data or release the TNL tunnel.

66. The method according to the supplement 65, wherein after the donor centralized unit configures for the IAB-node a TNL address allocated by the second donor distributed unit, or after the IAB-node completes a preset time of switching, or after the IAB-node completes a preset time of reestablishment, the first donor distributed unit receives the TNL tunnel transmission update or release request transmitted by the donor centralized unit.

67. The method according to the supplement 65, wherein the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, or a target TNL address of the downlink non-F1 data needing to deactivate the TNL tunnel transmission.

68. The method according to the supplement 65, wherein the method further includes:

transmitting, by the first donor distributed unit, a TNL tunnel transmission update or release response to the donor centralized unit, the TNL tunnel transmission update or release response including the endpoint TNL address of the TNL tunnel of the first donor distributed unit.

69. The method according to the supplement 68, wherein the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

70. The method according to the supplement 56, wherein the IAB node performs multi-path distribution in the donor centralized unit (intra-donor CU), and the first donor distributed unit and the second donor distributed unit belong to the same donor centralized unit (donor-CU).

71. The method according to the supplement 70, wherein the method further includes:

receiving, by the first donor distributed unit, a TNL tunnel transmission setup request transmitted by the donor centralized unit, the TNL tunnel transmission setup request including the endpoint TNL address of the TNL tunnel of the second donor distributed unit; the TNL tunnel transmission setup request is used to request the first donor distributed unit to set up the TNL tunnel or activate the TNL tunnel transmission of the downlink data.

72. The method according to the supplement 71, wherein in a case where the donor centralized unit configures a backhaul adaptive protocol (BAP) routing of the IAB-node as a BAP routing identifier of the second donor distributed unit but does not configure a TNL address allocated by the second donor distributed unit, the first donor distributed unit receives the TNL tunnel transmission setup request transmitted by the donor centralized unit.

73. The method according to the supplement 71, wherein the TNL tunnel transmission setup request further includes at least one of the following: a target TNL address of the downlink F1 user plane needing to activate the TNL tunnel transmission, a target TNL address of the downlink F1 control plane needing to activate the TNL tunnel transmission, a target TNL address of the downlink non-F1 data needing to activate the TNL tunnel transmission, or a GTP TEID of the downlink F1 user plane needing to activate the TNL tunnel transmission.

74. The method according to the supplement 71, wherein the method further includes:

transmitting, by the first donor distributed unit, a TNL tunnel transmission setup response to the donor centralized unit, the TNL tunnel transmission setup response including an endpoint TNL address of a TNL tunnel of the first donor distributed unit.

75. The method according to the supplement 74, wherein the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

76. The method according to the supplement 70, wherein the method further includes:

receiving, by the first donor distributed unit, a TNL tunnel transmission update or release request transmitted by the donor centralized unit, the TNL tunnel transmission update or release request including the endpoint TNL address of the TNL tunnel of the second donor distributed unit, wherein the TNL tunnel transmission update or release request is used to request the first donor distributed unit to deactivate TNL tunnel transmission of the downlink data or release the TNL tunnel.

77. The method according to the supplement 76, wherein after the donor centralized unit configures for the IAB-node a TNL address allocated by the second donor distributed unit, the first donor distributed unit receives the TNL tunnel transmission update or release request transmitted by the donor centralized unit.

78. The method according to the supplement 76, wherein the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, a target TNL address of the downlink non-F1 data needing to deactivate the TNL tunnel transmission, or a GTP TEID of the downlink F1 user plane needing to deactivate the TNL tunnel transmission.

79. The method according to the supplement 76, wherein the method further includes:

transmitting, by the first donor distributed unit, a TNL tunnel transmission update or release response to the donor centralized unit, the TNL tunnel transmission update or release response including the endpoint TNL address of the TNL tunnel of the first donor distributed unit.

80. The method according to the supplement 79, wherein the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

81. The method according to the supplement 56, wherein the IAB node switches from the first donor distributed unit to the second donor distributed unit, or RRC is reestablished to the second donor distributed unit after a radio link failure (RLF) from the IAB node to the first donor distributed unit, the first donor distributed unit belonging to a first donor centralized unit, and the second donor distributed unit belonging to a second donor centralized unit.

82. The method according to the supplement 81, wherein the method further includes: receiving, by the first donor distributed unit, a TNL tunnel transmission setup request transmitted by the first donor centralized unit, the TNL tunnel transmission setup request including the endpoint TNL address of the TNL tunnel of the second donor distributed unit; the TNL tunnel transmission setup request is used to request the first donor distributed unit to set up the TNL tunnel or activate the TNL tunnel transmission of the downlink data.

83. The method according to the supplement 82, wherein after the second donor centralized unit receives a switching completion message of the IAB-node, or after the second donor centralized unit receives an RRC reestablishment completion message of the IAB-node, or when the second donor centralized unit does not configure the TNL address allocated by the second donor distributed unit for the IAB-node, the first donor distributed unit receives the TNL tunnel transmission setup request transmitted by the first donor centralized unit.

84. The method according to the supplement 82, wherein the TNL tunnel transmission setup request further includes at least one of the following: a target TNL address of a downlink F1 user plane needing to activate the TNL tunnel transmission, a target TNL address of a downlink F1 control plane needing to activate the TNL tunnel transmission, or a target TNL address of downlink non-F1 data needing to activate the TNL tunnel transmission.

85. The method according to the supplement 82, wherein the method further includes:

transmitting, by the first donor distributed unit, a TNL tunnel transmission setup response to the first donor centralized unit, the TNL tunnel transmission setup response including an endpoint TNL address of a TNL tunnel of the first donor distributed unit.

86. The method according to the supplement 85, wherein the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

87. The method according to the supplement 81, wherein the method further includes:

receiving, by the first donor distributed unit, a TNL tunnel transmission update or release request transmitted by the first donor centralized unit, the TNL tunnel transmission update or release request including the endpoint TNL address of the TNL tunnel of the second donor distributed unit; wherein the TNL tunnel transmission update or release request is used to request the first donor distributed unit to deactivate TNL tunnel transmission of the downlink data or release the TNL tunnel.

88. The method according to the supplement 87, wherein after the second donor centralized unit configures for the IAB-node a TNL address allocated by the second donor distributed unit, or after the IAB-node completes a preset time of switching, or after the IAB-node completes a preset time of reestablishment, the first donor distributed unit receives the TNL tunnel transmission update or release request transmitted by the first donor centralized unit.

89. The method according to the supplement 87, wherein the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, or a target TNL address of the downlink non-F1 data needing to deactivate the TNL tunnel transmission.

90. The method according to the supplement 87, wherein the method further includes:

transmitting, by the first donor distributed unit, a TNL tunnel transmission update or release response to the first donor centralized unit, the TNL tunnel transmission update or release response including the endpoint TNL address of the TNL tunnel of the first donor distributed unit.

91. The method according to the supplement 90, wherein the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

92. The method according to the supplement 56, wherein the IAB node performs multi-path distribution across the donor centralized units (inter-donor CU), the first donor distributed unit belongs to a first donor centralized unit, and the second donor distributed unit belongs to a second donor centralized unit.

93. The method according to the supplement 92, wherein the method further includes:

receiving, by the first donor distributed unit, a TNL tunnel transmission setup request transmitted by the first donor centralized unit, the TNL tunnel transmission setup request including the endpoint TNL address of the TNL tunnel of the second donor distributed unit; the TNL tunnel transmission setup request is used to request the first donor distributed unit to set up the TNL tunnel or activate the TNL tunnel transmission of the downlink data.

94. The method according to the supplement 93, wherein in a case where the second donor centralized unit configures a backhaul adaptive protocol (BAP) routing of the IAB-node as a BAP routing identifier of the second donor distributed unit but does not configure for the downlink data a TNL address allocated by the second donor distributed unit, the first donor distributed unit receives the TNL tunnel transmission setup request transmitted by the first donor centralized unit.

95. The method according to the supplement 93, wherein the TNL tunnel transmission setup request further includes at least one of the following: a target TNL address of the downlink F1 user plane needing to activate the TNL tunnel transmission, a target TNL address of the downlink F1 control plane needing to activate the TNL tunnel transmission, a target TNL address of the downlink non-F1 data needing to activate the TNL tunnel transmission, or a GTP TEID of the downlink F1 user plane needing to activate the TNL tunnel transmission.

96. The method according to the supplement 93, wherein the method further includes:

transmitting, by the first donor distributed unit, a TNL tunnel transmission setup response to the first donor centralized unit, the TNL tunnel transmission setup response including an endpoint TNL address of a TNL tunnel of the first donor distributed unit.

97. The method according to the supplement 96, wherein the TNL tunnel transmission setup response further includes at least one of the following: a target TNL address of a downlink F1 user plane successfully activating the TNL tunnel transmission, a target TNL address of a downlink F1 control plane successfully activating the TNL tunnel transmission, a target TNL address of downlink non-F1 data successfully activating the TNL tunnel transmission, or a target TNL address failing in being activated.

98. The method according to the supplement 92, wherein the method further includes:

receiving, by the first donor distributed unit, a TNL tunnel transmission update or release request transmitted by the first donor centralized unit, the TNL tunnel transmission update or release request including the endpoint TNL address of the TNL tunnel of the second donor distributed unit, wherein the TNL tunnel transmission update or release request is used to request the first donor distributed unit to deactivate TNL tunnel transmission of the downlink data or release the TNL tunnel.

99. The method according to the supplement 98, wherein after the second donor centralized unit configures for the IAB-node a TNL address allocated by the second donor distributed unit, the first donor distributed unit receives the TNL tunnel transmission update or release request transmitted by the first donor centralized unit.

100. The method according to the supplement 98, wherein the TNL tunnel transmission update or release request further includes at least one of the following: a target TNL address of the downlink F1 user plane needing to deactivate the TNL tunnel transmission, a target TNL address of the downlink F1 control plane needing to deactivate the TNL tunnel transmission, a target TNL address of the downlink non-F1 data needing to deactivate the TNL tunnel transmission, or a GTP TEID of the downlink F1 user plane needing to deactivate the TNL tunnel transmission.

101. The method according to the supplement 98, wherein the method further includes:

transmitting, by the first donor distributed unit, a TNL tunnel transmission update or release response to the first donor centralized unit, the TNL tunnel transmission update or release response including the endpoint TNL address of the TNL tunnel of the first donor distributed unit.

102. The method according to the supplement 101, wherein the TNL tunnel transmission update or release response further includes at least one of the following: a target TNL address of a downlink F1 user plane successfully deactivating the TNL tunnel transmission, a target TNL address of a downlink F1 control plane successfully deactivating the TNL tunnel transmission, a target TNL address of downlink non-F1 data successfully deactivating the TNL tunnel transmission, or a target TNL address failing in being deactivated.

103. An integrated access and backhaul (IAB) communication method, wherein an IAB node is migrated from a first donor distributed unit to a second donor distributed unit; the method includes:

indicating, by a second donor centralized unit, the second donor distributed unit to receive uplink data transmitted by the IAB-node, and transmitting the uplink data to the first donor distributed unit via a transport network layer (TNL) tunnel between the second donor distributed unit and the first donor distributed unit, wherein the first donor distributed unit belongs to a first donor centralized unit, and the second donor distributed unit belongs to the second donor centralized unit.

104. The method according to the supplement 103, wherein the method further includes:

transmitting, by the second donor centralized unit, a TNL tunnel transmission setup request to the second donor distributed unit, the TNL tunnel transmission setup request including the endpoint TNL address of the TNL tunnel of the first donor distributed unit, wherein the TNL tunnel transmission setup request is used to request the second donor distributed unit to set up the TNL tunnel or activate the TNL tunnel transmission of the uplink data.

105. The method according to the supplement 104, wherein the endpoint TNL address of the TNL tunnel of the first donor distributed unit is transmitted by the first donor centralized unit to the second donor centralized unit.

106. The method according to the supplement 103, wherein when at least one of the following occurs, the second donor centralized unit transmits the TNL tunnel transmission setup request to the second donor distributed unit:

after the second donor centralized unit receives a switching completion message of the IAB-node, after the second donor centralized unit receives an RRC reestablishment completion message of the IAB-node, when the second donor centralized unit does not configure a TNL address allocated by the second donor distributed unit for the IAB-node.

107. The method according to the supplement 104, wherein the method further includes:

further receiving, by the second donor centralized unit, a TNL address allocated by the first donor distributed unit for the IAB-node and transmitted by the first donor centralized unit, so that the second donor centralized unit transmits a TNL tunnel transmission setup request to the second donor distributed unit.

108. An integrated access and backhaul (IAB) communication method, wherein an IAB node is migrated from a first donor distributed unit to a second donor distributed unit; the method includes:

indicating, by a first donor centralized unit, the first donor distributed unit to receive downlink data transmitted to the IAB-node, and transmitting the downlink data to the second donor distributed unit via a transport network layer (TNL) tunnel between the first donor distributed unit and the second donor distributed unit, wherein the first donor distributed unit belongs to the first donor centralized unit, and the second donor distributed unit belongs to a second donor centralized unit.

109. The method according to the supplement 108, wherein the method further includes:

further transmitting, by the first donor centralized unit, a TNL tunnel transmission update or release request to the first donor distributed unit, the TNL tunnel transmission update or release request including the endpoint TNL address of the TNL tunnel of the second donor distributed unit, wherein the TNL tunnel transmission update or release request is used to request the first donor distributed unit to deactivate TNL tunnel transmission of the downlink data or release the TNL tunnel.

110. The method according to the supplement 109, wherein the endpoint TNL address of the TNL tunnel of the second donor distributed unit is transmitted by the second donor centralized unit to the first donor centralized unit.

111. The method according to the supplement 109, wherein after the second donor centralized unit configures for the IAB-node a TNL address allocated by the second donor distributed unit, the first donor centralized unit transmits the TNL tunnel transmission update or release request to the first donor distributed unit.

112. The method according to the supplement 109, wherein the second donor centralized unit further transmits a TNL address allocated by the second donor distributed unit for the IAB-node to the first donor centralized unit, so as to trigger the first donor centralized unit to transmit the TNL tunnel transmission update or release request to the first donor distributed unit.

113. An integrated access and backhaul (IAB) communication method, wherein an IAB node is migrated from a first donor distributed unit to a second donor distributed unit; the method includes:

indicating, by a donor centralized unit, the second donor distributed unit to receive uplink data transmitted by the IAB-node, and transmitting the uplink data to the first donor distributed unit via a transport network layer (TNL) tunnel between the second donor distributed unit and the first donor distributed unit, wherein the first donor distributed unit and the second donor distributed unit belong to the donor centralized unit.

114. An integrated access and backhaul (IAB) communication method, wherein an IAB node is migrated from a first donor distributed unit to a second donor distributed unit; the method includes:

indicating, by a donor centralized unit, the first donor distributed unit to receive downlink data transmitted to the IAB-node, and transmitting the downlink data to the second donor distributed unit via a transport network layer (TNL) tunnel between the first donor distributed unit and the second donor distributed unit, wherein the first donor distributed unit and the second donor distributed unit belong to the donor centralized unit.

115. A donor (Donor) equipment, including a memory and a processor, the memory storing a computer program, wherein the processor is configured to execute the IAB communication method according to any one of the supplements 1 to 114.

116. A communication system, including a donor (Donor) equipment and an IAB node (IAB-node); wherein the donor (Donor) equipment is configured to execute the IAB communication method according to any one of the supplements 1 to 114.

What is claimed is:

1. An integrated access and backhaul (IAB) communication device, applicable to a second donor integrated access and backhaul distributed unit (IAB-donor-DU), the IAB communication device, comprising:

a receiver configured to receive uplink packet transmitted by an IAB node;

processor circuitry configured to add a header related to a transport network layer (TNL) tunnel to the uplink packet; and a transmitter configured to transmit the uplink packet to a first IAB-donor-DU via the transport network layer tunnel, wherein a source TNL address of the uplink packet is anchored at the first IAB-donor-DU, wherein the receiver is further configured to receive configuration of the source TNL address of the uplink packet from the IAB-donor-CU, and wherein the source TNL address is permitted being forwarded to the first IAB-donor-DU and excepted from TNL address filtering by the second IAB-donor-DU.

2. The IAB communication device according to claim 1, wherein the header comprises at least one of the following: an Internet Protocol header, a General Packet Radio Service Tunneling Protocol header, a User Datagram Protocol header or a Transmission Control Protocol header.

3. The IAB communication device according to claim 1, wherein the IAB node switches from the first IAB-donor-DU to a second IAB-donor-DU, or radio resource control is reestablished to a second IAB-donor-DU after a radio link from the IAB node to the first IAB-donor-DU fails, and wherein the first IAB-donor-DU and the second IAB-donor-DU belong to the same donor IAB centralized unit (IAB-donor-CU).

4. The IAB communication device according to claim 1, wherein the first IAB-donor-DU and a second IAB-donor-DU belong to the same donor IAB centralized unit (IAB-donor-CU).

5. The IAB communication device according to claim 1, wherein the IAB node switches from the first IAB-donor-DU to the second IAB-donor-DU, or RRC is reestablished to the second IAB-donor-DU after a radio link from the IAB node to the first IAB-donor-DU fails; the first IAB-donor-DU belongs to a first IAB-donor-CU, and the second IAB-donor-DU belongs to a second IAB-donor-CU.

6. The IAB communication device according to claim 1, wherein the first IAB-donor-DU belongs to a first donor IAB centralized unit (first IAB-donor-CU), and a second IAB-donor-DU belongs to a second donor IAB centralized unit (second IAB-donor-CU).

7. The IAB communication device according to claim 6, wherein the receiver is further configured to receive configuration of a source TNL address of the uplink packets delivered by the second IAB-donor-CU; wherein, the source TNL address is permitted being forwarded to the first IAB-donor-DU and excepted from TNL address filtering by the second IAB-donor-DU.

8. A method by performing a second IAB-donor-CU for integrated access and backhaul (IAB) communication, wherein an IAB-node moves from a first IAB-donor-DU to a second IAB-donor-DU, the method comprising:

indicating to the second IAB-donor-DU to receive uplink packet from the IAB-node and deliver the uplink data packet to a first IAB-donor-DU via a TNL tunnel between the first IAB-donor-DU and the second IAB-donor-DU;

wherein, the first IAB-donor-DU belongs to a first doner IAB-IAB-donor-CU, and the second IAB-donor-DU belongs to a second IAB-donor-CU.

9. The method according to claim 8, wherein, the method further comprising:

sending a TNL tunnel transmission setup request to the second IAB-donor-DU, the TNL tunnel transmission setup request including an endpoint TNL address of the TNL tunnel of the first donor distributed unit; wherein the TNL tunnel transmission setup request is used to request the second IAB-donor-DU to set up the TNL tunnel or activate TNL tunnel transmission of uplink data.

10. The method according to claim 8, wherein, the method further comprising:

receiving configuration of a source TNL address of the uplink packet sent by the first IAB-donor-CU, so that the second IAB-CU sends the source TNL address of the uplink packet to the second IAB-donor-DU.

* * * * *